(12) United States Patent
Yamamoto et al.

(10) Patent No.: US 7,382,402 B2
(45) Date of Patent: Jun. 3, 2008

(54) IMAGING SYSTEM

(75) Inventors: Yasutoshi Yamamoto, Hirakata (JP); Tomoaki Tsutsumi, Kadoma (JP); Yukihiro Tanizoe, Kadoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 386 days.

(21) Appl. No.: 10/522,066

(22) PCT Filed: Jul. 24, 2003

(86) PCT No.: PCT/JP03/09407

§ 371 (c)(1),
(2), (4) Date: Jul. 7, 2005

(87) PCT Pub. No.: WO2004/017628

PCT Pub. Date: Feb. 26, 2004

(65) Prior Publication Data

US 2006/0119712 A1  Jun. 8, 2006

(30) Foreign Application Priority Data

Jul. 24, 2002  (JP)  ............................. 2002-214765
Oct. 16, 2002  (JP)  ............................. 2002-301829

(51) Int. Cl.
*H04N 5/235* (2006.01)
(52) U.S. Cl. .................................................. 348/229.1
(58) Field of Classification Search ............. 348/229.1, 348/364, 169, 229, 224, 225, 234, 362, 256
See application file for complete search history.

(56) References Cited

U.S. PATENT DOCUMENTS 5,880,782 A * 3/1999 Koyanagi et al. ........... 348/364
6,674,464 B1   1/2004 Mizutani et al.
6,697,127 B2 * 2/2004 Suzuki ....................... 348/674
7,170,633 B2 * 1/2007 Hara et al. .................. 358/1.9
7,298,402 B2 * 11/2007 Horiuchi ................... 348/229.1

(Continued)

FOREIGN PATENT DOCUMENTS

CN   1243384 A   2/2000

(Continued)

OTHER PUBLICATIONS

International Search Report for PCT/JP2003/09407, dated Dec. 16, 2003.

(Continued)

*Primary Examiner*—Lin Ye
*Assistant Examiner*—Amy Hsu
(74) *Attorney, Agent, or Firm*—RatnerPrestia

(57) ABSTRACT

An imaging system includes an imaging device which outputs a plurality of digital signals each of which indicating an amount of light irradiating on a corresponding one of a plurality of pixels arranged in two dimensions, a pre-processor which reduces an amount of data of the plurality of the digital signals output by the imaging device, a processor which processes digital signals, a memory which stores the digital signals, and a memory controller which stores the plurality of the digital signals output by the pre-processor in the memory and reads the plurality of the digital signals from the memory to output the plurality of the digital signals to the processor.

4 Claims, 23 Drawing Sheets

U.S. PATENT DOCUMENTS

2001/0035909 A1    11/2001    Kubo

FOREIGN PATENT DOCUMENTS

| EP | 0 868 092 A2 | 9/1998 |
|---|---|---|
| JP | 10-178612 | 6/1998 |
| JP | 2000-059656 | 2/2000 |
| JP | 2000-092376 | 3/2000 |
| JP | 2000-354193 | 12/2000 |
| JP | 2001-249858 A | 9/2001 |

OTHER PUBLICATIONS

Supplementary Partial European Search Report for EP 03 78 8017, dated Sep. 14, 2006.

* cited by examiner

IMAGING SYSTEM

This application is a U.S. National Phase application of PCT International Application PCT/JP2003/09407.

TECHNICAL FIELD

The present invention relates to an imaging system used in a digital still camera and the like.

BACKGROUND ART

The conventional imaging system includes an analog-to digital (A/D) converter for converting analog signals output from an imaging element to digital signals (A/D conversion), a data processing section for processing the image data, a memory for storing the image data, and a memory control section, wherein the image data output from the A/D converter or the data processing section is stored in the memory or the image data is transferred from the memory to another data processing section by means of the memory control section (refer to e.g., Japanese Laid-Open Patent Publication No. 10-178612).

FIG. 28 is a block diagram of a configuration of such a conventional imaging system. As shown in FIG. 28, the imaging system 200 includes an optical lens 211, a solid-state imaging element 212, a drive circuit 213 of the solid-state imaging element 212, an analog circuit 214, an A/D conversion circuit 215, a memory controller 216, a Synchronous Dynamic Random Access Memory (hereinafter referred to as "SDRAM") 217 serving as a memory circuit, a camera signal processing circuit 218, a JPEG compression circuit 219, a display circuit 220, a liquid crystal display unit 221, a card controller 222, and a recording medium 223.

The operation of the imaging system 200 will now be described. When light enters through the optical lens 211, the solid-state imaging element 212 is irradiated with the light. The solid-state imaging element 212 photoelectrically transfers the light irradiating thereon, and outputs the obtained electric signals (analog signals) to the analog circuit 214. The analog circuit 214 performs the analog signal process on the analog signals output from the solid-state imaging element 212, and outputs the processed analog signals to the A/D conversion circuit 215. The A/D conversion circuit 215 converts the analog signals output from the analog circuit 214 to a digital signal. Here, the digital signals output by the A/D conversion circuit 215 is signals before the digital signal process is performed thereon, and thus is referred to as raw data (RAW). The A/D conversion circuit 215 outputs the raw data to the memory controller 216. The memory controller 216 then stores the raw data, which is output from the A/D conversion circuit 215, to the SDRAM 217.

The memory controller 216 then reads the raw data stored in the SDRAM 217 and transfers the raw data to the camera signal processing circuit 218. The camera signal processing circuit 218 performs camera signal process on the raw data read out from the SDRAM 217, and generates YC data (YC) for recording and for displaying expressed by a luminance signals (Y) and a chrominance signals (C) The camera signal processing circuit 218 performs a zoom process and the like on the raw data to generate the YC data for displaying. The memory controller 216 reads the YC data from the camera signal processing circuit 218 and stores such YC data in the SDRAM 217.

Next, when compressing and storing the YC data in the SDRAM 217, the memory controller 216 reads and outputs the YC data for recording stored in the SDRAM 217 to the JPEG compression circuit 219. The JPEG compression circuit 219 performs the compression process according to the Joint Photographic Experts Group (JPEG) standard, and generates coded data (JPC). The memory controller 216 reads the coded data from the JPEG compression circuit 219, and stores the coded data in the SDRAM 217.

When displaying the captured image on the liquid crystal display unit 221, the memory controller 216 reads the YC data for displaying stored in the SDRAM 217 and transfers such YC data to the display circuit 220. The display circuit 220 converts the YC data to signals (display data) for displaying and outputs the signals to the liquid crystal display unit 221. The liquid crystal display unit 221 displays the image represented by the signals for displaying.

The card controller 222 is connected to the SDRAM 217 and reads out the JPEG coded data stored in the SDRAM 217 and writes such data into the recording medium 223.

As mentioned above, in the conventional imaging system, many data such as raw data, YC data, coded data, display data and the like are transferred between the memory and the memory controller. Thus, the power consumption at the interface of the memory and the memory controller becomes large, that is, the power consumption becomes large.

Further, in the conventional imaging system, the processing speed tends to be slow due to large amounts of data to be handled. In order to increase the processing speed, either the operation frequency must be increased or the processing performance of the circuit must be enhanced, but in either case, the power consumption increases. In other words, it is difficult to increase the processing speed without increasing the power consumption.

It is therefore an object of the present invention to provide an imaging system in which the power consumption is small and the speed of processing the data is fast.

DISCLOSURE OF INVENTION

According to the first aspect of the present invention, an imaging system includes an imaging device which outputs a plurality of digital signals each of which indicating an amount of light irradiating on a corresponding one of two-dimensionally arranged pixels on which light irradiates, a pre-processor which reduces an amount of data of the plurality of the digital signals output by the imaging device, a processor which processes the plurality of the digital signals, a memory which stores the plurality of the digital signals, and a memory controller which store the plurality of the digital signals output by the pre-processor to the memory, and reads the plurality of the digital signals from the memory to output the plurality of the digital signals to the processor.

Preferably, the pre-processor includes a first reducing device which reduces an amount of information of each of the plurality of the digital signals.

Preferably, the first reducing device includes a detector which detects an average signal amount which indicates an average value of a signal amount of the plurality of the digital signals for one screen output by the imaging device, a calculating device which calculates a gain to be applied to the plurality of the digital signals so that the average value equals to a predetermined value, and a gain adjusting device which adjusts, using the gain, a gain of the plurality of the digital signals.

Preferably, the two-dimensionally arranged pixels include a set of pixels each of which detecting light of a corresponding one of a plurality of color components. The imaging device outputs the plurality of the digital signals each of which indicating an amount of light detected by a corresponding one of the two-dimensionally arranged pixels on which light irradiates. The first reducing device includes a detector which detects, using the plurality of the digital signals output by the imaging device, a first average signal amount indicates an first average value of a signal amount of the plurality of the digital signals for one screen in correspondence to each of the plurality of the color components, a calculating device which calculates a first gain to be applied to the plurality of the digital signals in correspondence to each of the plurality of the color components so that the first average signal amounts in correspondence to the plurality of the color components are the same, and a first white balance adjuster which does white balance adjustment by adjusting, using the first gain corresponding to each of the plurality of the color components, a gain of the plurality of the digital signals in correspondence to each of the plurality of the color components.

Preferably, the first reducing device further includes a second white balance adjuster, the second white balance adjuster does white balance adjustment by adjusting a gain of a plurality of digital signals in correspondence to each of the plurality of the color components output by the imaging device, using a predetermined gain in correspondence to each of the plurality of the color components, and an output signal of the second white balance adjuster is input to the first white balance adjuster.

Preferably, the first reducing device further includes a gradation correcting device, and the gradation correcting device convert the plurality of the digital signals input thereto to a plurality of converted digital signals each of which having a predetermined amount of information smaller than an amount of information of each of the plurality of the digital signals input thereto, by correcting gradation of the plurality of the digital signals input from any one of the imaging device, the gain adjusting device, and the first white balance adjustor to.

Preferably, the first reducing device further includes a compression device which compresses a plurality of digital signals input thereto to reduce an amount of information of each of the plurality of the digital signals.

Preferably, the compression device compresses the plurality of the digital signals input thereto into the plurality of the digital signals all having the same amount of information.

Preferably, the imaging system further includes a driver which drives the imaging device, a function controller which controls an transfer of digital signals among the first reducing device, the memory controller, and the processor, and a mode setter which sets one of a first mode and a second mode to each of the driver and the function controller. The first reducing device includes a second reducing device and a third reducing device, each of the second and third reducing devices reduces an amount of information of each of the plurality of the digital signals output by the imaging device. The function controller outputs the plurality of the digital signals input from the second reducing device to the third reducing device, outputs the plurality of the digital signals input from the third reducing device to the memory controller, and outputs the plurality of the digital signals input from the memory controller to the processor, when the first mode is set by the mode setter, while outputs the plurality of the digital signals input from the second reducing device to the memory controller, outputs the plurality of the digital signals input from the memory controller to the third reducing device, and outputs the plurality of the digital signals input from the third reducing device to the processor, when the second mode is set by the mode setter.

Preferably, the pre-processor includes a thinning out device which thins out the plurality of the digital signals.

Preferably, the thinning out device outputs a first control signal a level of which changes at a constant cycle to the memory controller. The pre-processor outputs the plurality of the digital signals output by the imaging device and the first control signal to the memory controller together. The memory controller stores to the memory only a digital signal among the plurality of the digital signals which the digital signal is input to the memory controller when the control signal is at a predetermined level.

Preferably, the pre-processor further includes an interpolation device, the interpolation device interpolates the plurality of the digital signals output by the imaging device to output a plurality of interpolated digital signals obtained as a result of the interpolation, and the pre-processor outputs the first control signal and the plurality of the interpolated digital signals to the memory controller together.

Preferably, the imaging system further includes a release button, a second detector which outputs a status signal indicating whether the release button is pushed or not, and a thinning out controller which starts or stops an operation of the thinning out device in accordance with the status signal output by the second detector.

Preferably, the imaging system further includes a mode switching device which outputs a mode signal indicating one of a first mode and a second mode, and a mode control device which controls the memory controller in accordance with the mode signal output by the mode switching device. The processor includes a first compression device and a second compression device, and the mode control device makes the memory controller read the plurality of the digital signals from the memory to output the plurality of the digital signals to the first compression device when the mode signal indicating the first mode is input, while makes the memory controller read the plurality of the digital signals from the memory to output the plurality of the digital signals to the second compression device when the mode signal indicating the second mode is input.

Preferably, the imaging system further includes a selector which selects the number of recording pixels to output a second control signal indicating the number of recording pixels selected thereby, and a ratio controller which determines a ratio of thinning out the plurality of the digital signals in accordance with the second control signal output by the selector, and controls a change cycle of the level of the control signal output by the thinning out device in accordance with the ratio.

An advantage of an imaging system according to the present invention is that it can realize an imaging system which is small in power consumption and fast in speed of processing the data.

BRIEF DESCRIPTION OF DRAWINGS

Additional objects and advantages of the present invention will be apparent from the following detailed description of preferred embodiments thereof, which are best understood with reference to the accompanying drawings.

BEST MODE FOR CARRYING OUT THE INVENTION

The following is a detailed description of main embodiments of the invention, with reference to the drawings in which the same numerical references designate the corresponding elements throughout the different drawings.

The imaging systems described in the following embodiments include, between the A/D conversion circuit and the memory controller, a pre-processing circuit for processing the output signal of the A/D conversion circuit before being output to the memory controller.

The imaging systems of a first embodiment to a fifth embodiment explained below include an information amount reducing circuit which reduces the number of bits (amount of information) of the signals as the pre-processing circuit arranged between the A/D conversion circuit and the memory controller. With the information amount reducing circuit, the amount of information of each of the digital signals output by the A/D conversion circuit is reduced, and as a result, the amount of signal (represented by $2^k$ when the number of bits of the signal is "k") of each of the digital signals is reduced. These imaging systems reduce the amount of signal of each of the digital signals output by the A/D conversion circuit and output the digital signals in which the amount of signal is reduced to the memory controller, thereby reducing the amount of data (amount of data=the number of data×amount of information) transferred among the SDRAM and the memory controller, and reducing the power consumption at the interface of the SDRAM and the memory controller.

FIRST EMBODIMENT

An imaging system according to the present embodiment includes an information amount reducing circuit having a gain adjusting circuit, a level detecting circuit and a microcomputer.

Figure 1:
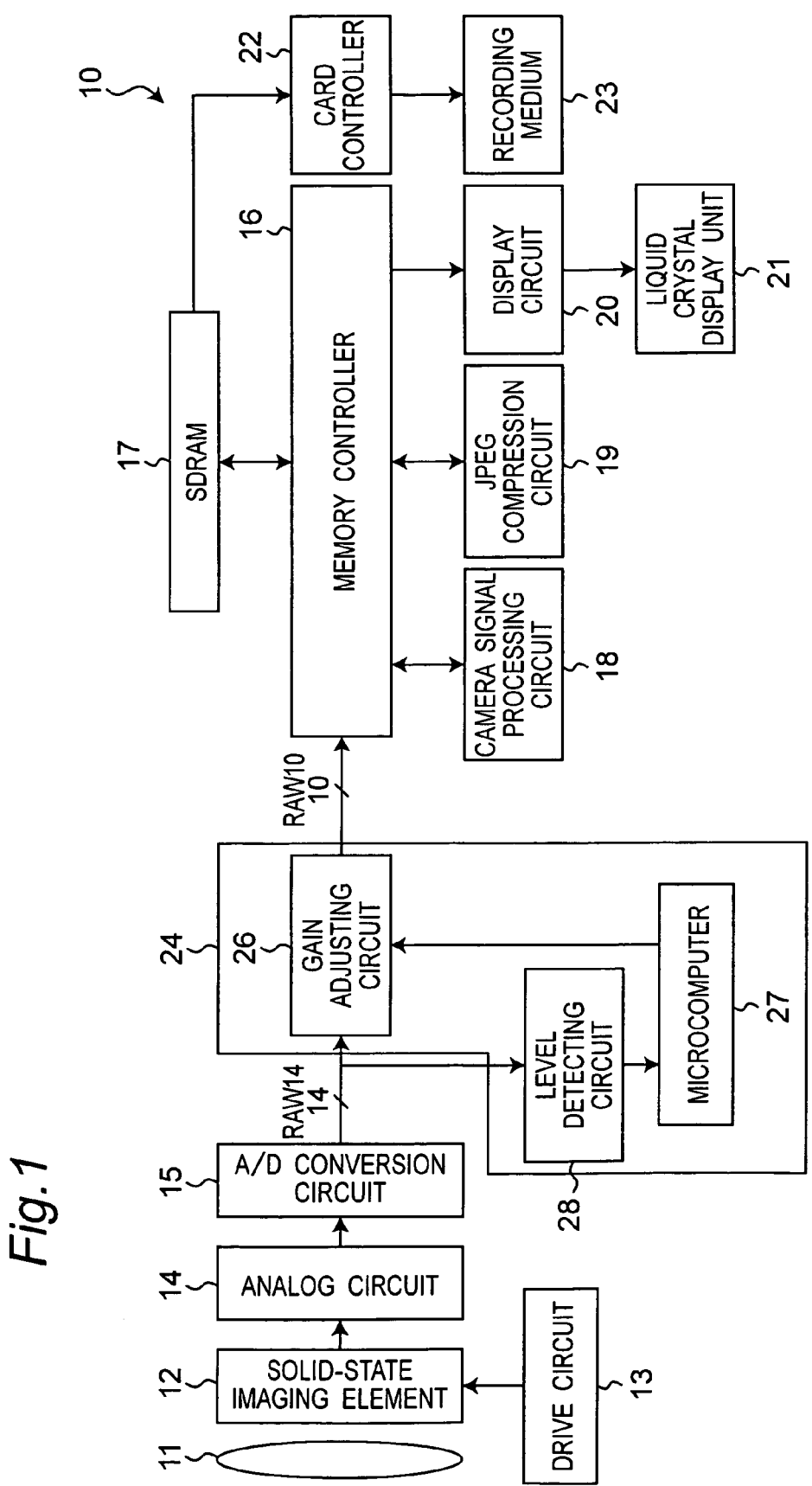
FIG. 1 is a block diagram of a configuration of an imaging system according to a first embodiment.

FIG. 1 is a block diagram of a configuration of the imaging system according to a first embodiment. In FIG. 1, the imaging system 10 includes an optical lens 11, a solid-state imaging element 12, a drive circuit 13 of the solid-state imaging element 12, an analog circuit 14, an A/D conversion circuit 15, a memory controller 16, an SDRAM 17 serving as a memory circuit, a camera signal processing circuit 18, a JPEG compression circuit 19, a display circuit 20, a liquid crystal display unit 21, a card controller 22, a recording medium 23, and a pre-processing circuit 24. The pre-processing circuit 24 includes the information amount reducing circuit having a gain adjusting circuit 26, a microcomputer 27, and a level detecting circuit 28.

The optical lens 11 converges light to the solid-state imaging element 12. The drive circuit 13 is connected to the solid-state imaging element 12 to control the solid-state imaging element 12. The analog circuit 14 is connected to the solid-state imaging element 12 to perform an analog signal process on analog signals output from the solid-state imaging element 12. The A/D conversion circuit 15 is connected to the analog circuit 14 to convert the analog signals output by the analog circuit 14 to the digital signals. The pre-processing circuit 24 is connected to the A/D conversion circuit 15 to reduce the amount of information of each of the signals output by the A/D conversion circuit 15 and to output the digital signals whose amounts of information are reduced. The memory controller 16 is connected to the SDRAM 17, and reads data from the SDRAM 17 or writes data in the SDRAM 17. Further, the memory controller 16 is connected to the gain adjusting circuit 26, the camera processing circuit 18, the JPEG compression circuit 19, and the display circuit 20 to control the input/output of data between the SDRAM 17 and each of the above components. The liquid crystal display unit 21 is connected to the display circuit 20 to display an image represented by the data output by the display circuit 20. The card controller 22 is connected to the SDRAM 17 and the recording medium 23 to read the data stored in the SDRAM 17 and write it in the recording medium 23.

In the imaging system 10, operations from when light enters the optical lens 11 until the A/D conversion circuit 15 outputs the digital signals are as follows. When light enters the optical lens 11, the light is passed through the optical lens 11 and the solid-state imaging element 12 is irradiated with the light. The solid-state imaging element 12 photoelectrically transfers the light irradiating thereon and outputs the obtained electric signals (analog signals) to the analog circuit 14. The analog circuit 14 performs the analog signal process on the analog signals output from the solid-state imaging element 12, and outputs the processed analog signals to the A/D conversion circuit 15. The A/D conversion circuit 15 converts the analog signals output from the analog circuit 14 to the digital signals.

The solid-state imaging element 12 is, for example, a charge coupled device (hereinafter referred to as "CCD") The solid-state imaging element 12 consists of a number of pixels arranged in two dimensions. For example, if the number of pixels of the solid-state imaging element 12 is five million pixels, the number of effective pixels is 2560 pixels in the horizontal direction and 1920 lines in the vertical direction. When the imaging element 12 is irradiated with light, the imaging element 12 generates a plurality of electric signals indicating an amount of light irradiating on each pixel. The A/D conversion circuit 15 outputs a plurality of digital signals each of which indicating the amount of light irradiating on each pixel of the imaging element 12. The number of digital signals each of which corresponds to each pixel of the imaging element is hereinafter referred to as "the number of data".

In the imaging system 10, the amount of information of each of the digital signals output by the A/D conversion circuit 15 is 14 bits. Each of those digital signals are the digitalized representation of the amount of light entering the optical lens 11, and the greater the number of bits, the wider the range of brightness is. The A/D converted 14 bits of raw data (RAW 14) is input to the gain adjusting circuit 26. The gain adjusting circuit 26 performs gain adjustment on the 14 bits of raw data by gain "A" applied by the microcomputer 27. Consequently, the amount of information of the raw data is reduced, and 10 bits of raw data (RAW 10) is output from the gain adjusting circuit 26. Assuming that an amount of signal of RAW 10 and that of RAW 14 is $R_{10}$ and $R_{14}$, respectively, the following Eq. (1) is obtained.

$$R_{10} = R_{14} \times A \qquad (1)$$

The gain "A" will now be explained. The output signals of the solid-state imaging element 12 are A/D converted to digital signals, and such digital signals are input to the gain adjusting circuit 26. Here, the A/D converted raw data (RAW 14) is input to the gain adjusting circuit 26 and at the same time input to the level detecting circuit 28. The level detecting circuit 28 detects an average signal amount of the input raw data for one screen. The average signal amount of the raw data for one screen is the average value of the signal amounts of a plurality of digital signals obtained by A/D converting electric signals, each of which is generated by each pixel of the imaging element 12 when one scene is captured. More specifically, it is a value obtained by dividing the maximum value of the signal amount of the digital signals output by the A/D conversion circuit 15 by 2. The level detecting circuit 28 outputs the average signal amount to the microcomputer 27. The microcomputer 27 calculates a gain "A" for each of the input average signal amount so that the value of the signal amount obtained by multiplying the input average signal amount and the gain becomes a predetermined value.

Figure 2:
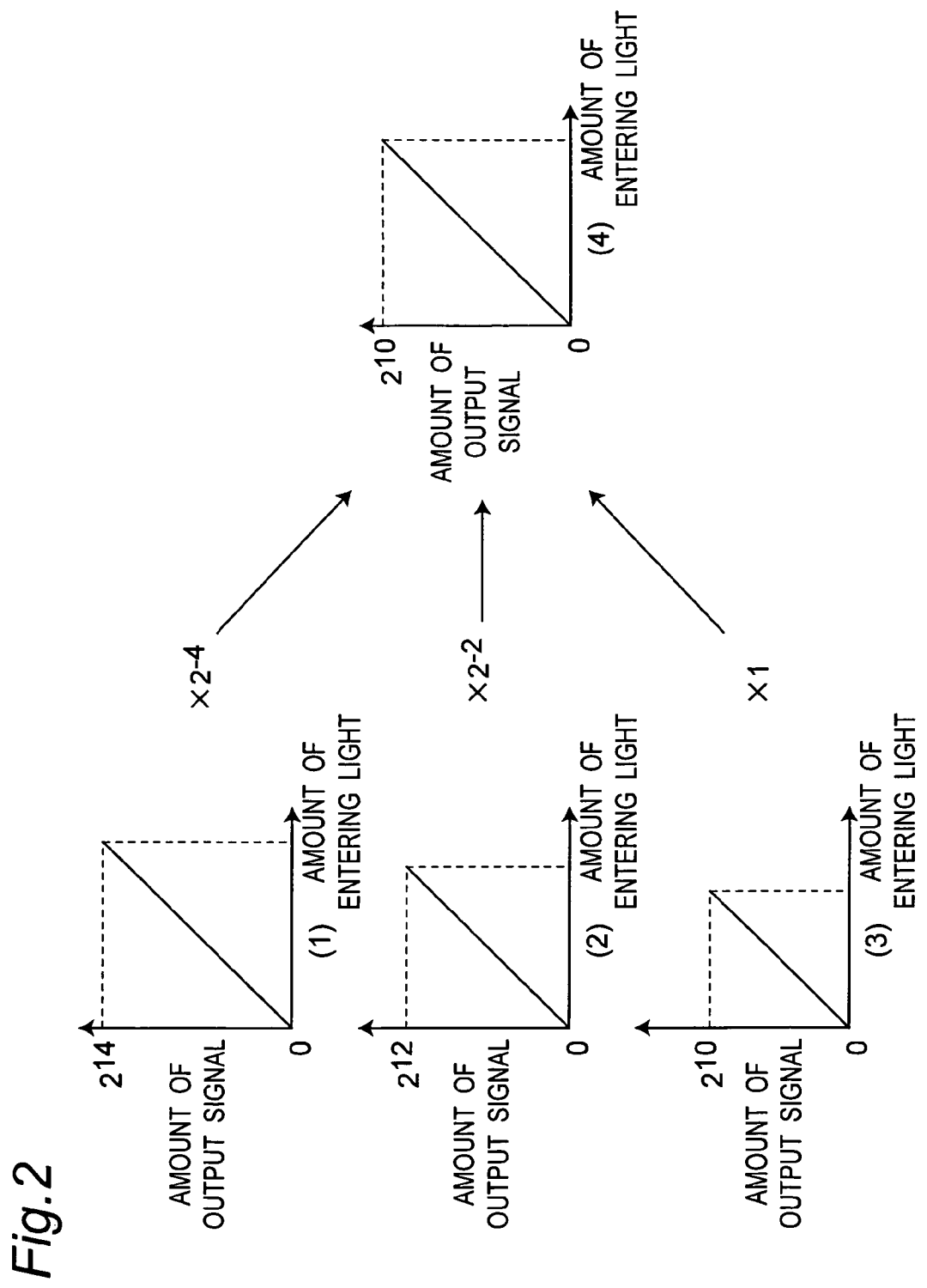
FIG. 2 is a view for explaining the operation of a gain adjusting circuit.

FIG. 2 shows the relationship between the average signal amount of the raw data (RAW 14) for one screen and the gain "A". FIGS. 2 (1), (2), and (3) are graphs each showing the range of the amount of light entering the imaging element 12, and the range of the signal amount of a plurality of digital signals output from the A/D conversion circuit 15 when screens different from each other are input to the imaging system 10 (that is, when scenes different from each other are imaged by the imaging system 10). In each graph in FIGS. 2 (1), (2), and (3), the axis of abscissa shows the amount of light entering the imaging element 12, and the axis of ordinate shows the amount of signal of the digital signals output from the A/D conversion circuit 15. As shown in (1), (2), and (3) of FIG. 2, the amount of light entering the imaging element 12 is a wide range, and the dynamic range of the amount of signal of the digital data output by the A/D conversion circuit 15 is also large. Referring to the graphs of (1), (2), and (3) of FIG. 2, it is apparent that the range of the signal amount of the output digital data differs for each screen. The amount of signal of the digital data output by the A/D conversion circuit 15 changes (1) from 0 to $2^{14}$, (2) from 0 to $2^{12}$, and (3) from 0 to $2^{10}$ in one screen, and the average signal amount detected by the level detecting circuit 28 is $2^{13}$, $2^{11}$, and $2^9$, respectively. The microcomputer 27 calculates the gain "A" so that the final average signal amount obtained by multiplying the input average signal amount and the gain is all constant, that is, so that the input average signal amount becomes a predetermined average signal amount by applying the gain. For instance, if the final average signal amount is set to $2^9$, the microcomputer 27, when the raw data shown in (1), (2) and (3) of FIG. 2 is input, calculates a gain "A" as $2^{-4}$, $2^{-2}$, and 1, respectively. Here, according to an Eq. (1), the maximum value of the amount of signal is $2^{10}$, and the average signal amount is $2^9$ in all cases.

When the raw data is input from the A/D conversion circuit 15, the gain adjusting circuit 26 performs gain adjustment using the gain "A" output from the microcomputer 27, and converts the raw data input from the A/D conversion circuit 15 to the raw data with a predetermined average signal amount. Thus, the gain adjustment circuit 26 outputs raw data having smaller amount of information than the input raw data.

As above, the gain adjustment circuit 26 reduces the number of bits of each of the digital signals output from the A/D conversion circuit 15 from 14 bits to 10 bits, that is, by $^{10}/_{14}$. The gain adjustment circuit 26 outputs the 10 bits of raw data (RAW 10) in which the number of bits is reduced to the memory controller 16. The memory controller 16 stores the 10 bits of raw data in the SDRAM 17.

The memory controller 16 then reads the 10 bits of raw data stored in the SDRAM 17 and transfers such raw data to the camera signal processing circuit 18. The camera signal processing circuit 18 performs camera signal process on the transferred raw data, and converts the transferred raw data to the YC data (YC) for recording and for displaying expressed by the luminance signals (Y) and the chrominance signals (C). The memory controller 16 reads the YC data for recording and for displaying obtained through conversion from the camera signal processing circuit 18 and again stores it to the SDRAM 17. The camera signal processing circuit 18 performs processes such as, white balance process, gamma (γ) conversion process, luminance signal generating process, chrominance signal generating process and an aperture correcting process for improving resolution on the raw data. Further, the camera signal processing circuit 18 performs zoom process (to be hereinafter described) and the like using a zoom processing circuit (not shown) to generate the YC data for displaying.

Next, when displaying the captured image on the liquid crystal display unit 21, the memory controller 16 reads the YC data for displaying stored in the SDRAM 17 and transfers the YC data to the display circuit 20. The display circuit 20 converts the YC data to the signals for displaying (display data), and outputs the signals to the liquid crystal display unit 21. The liquid crystal display unit 21 displays the image represented by such signals.

When compressing and storing the YC data in the SDRAM 17, the memory controller 16 reads the YC data for recording stored in the SDRAM 17 and outputs the YC data for recoding to the JPEG compression circuit 19. The JPFG compression circuit 19 performs compression process according to the JPEG (Joint Photographic Experts Group) standard and generates the coded data (JPC). The memory controller 16 reads the coded data from the JPEG compression circuit 19 and stores the data in the SDRAM 17.

The card controller 22 is connected to the SDRAM 17, and reads the JPEG coded data stored in the SDRAM 17 and writes it in the recording medium 23.

The power consumed at the interface of the memory controller 16 and the SDRAM 17 when the number of bits of the raw data stored in the SDRAM 17 or read from the SDRAM 17 by the memory controller 16 is changed from 14 bits to 10 bits will now be estimated. A case of displaying the captured image on the liquid crystal display unit 21 will now be considered by way of an example. The number of pixels of the imaging element 12 is assumed to be five million pixels and the number of pixels of one horizontal line is assumed to be 2560 pixels by way of an example. Further, the number of pixels per one horizontal line when the zoom process is performed by the camera signal processing circuit 18, and the YC data (luminance signals of 8 bits, chrominance signals of 8 bits) for displaying is generated is assumed to be 720 pixels.

When displaying the captured image on the liquid crystal display unit 21, the flow of data transferred between the memory controller 16 and the SDRAM 17 is as follows.

First, the memory controller 16 stores the raw data output from the A/D conversion circuit 15 to the SDRAM 17 (1). Next, the memory controller 16 reads the raw data from the SDRAM 17 and outputs the raw data to the camera signal processing circuit 18 (2). Further, when the camera signal processing circuit 18 generates the YC data for displaying, the memory controller 16 reads the YC data from the camera signal processing circuit 18 and stores the YC data to the SDRAM 17 (3). Finally, the memory controller 16 reads the YC data from the SDRAM 17 and outputs the YC data to the display circuit 20 (4). The memory controller 16 may be controlled with software by a control circuit (microcomputer) provided separately.

When the raw data output from the A/D conversion circuit 15 is reduced from 14 bits to 10 bits, the amount of data of the data transferred between the memory controller 16 and the SDRAM 17 is expressed by the following Eq. (2) per one horizontal line.

$$2560 \text{ pixels} \times 10 \text{ bits} \times 2 + 720 \text{ pixels} \times (8+8) \text{ bits} \times 2 = 74240 \text{ bits} \quad (2)$$

On the other hand, when the amount of information of the raw data is not reduced and is remained 14 bits, the amount of data of the data transferred between the memory controller 16 and the SDRAM 17 is expressed by the following Eq. (3) per one horizontal line.

$$2560 \text{ pixels} \times 14 \text{ bits} \times 2 + 720 \text{ pixels} \times (8+8) \text{ bits} \times 2 = 94720 \text{ bits} \quad (3)$$

Referring to Eq. (2) and Eq. (3), the amount of data of the data transferred between the memory controller 16 and the SDRAM 17 differs between when the information amount of the raw data is reduced and when not reduced. More specifically, since 74247/94720=0.78 is concluded, when the amount of information is reduced, the amount of data of the data transferred between the memory controller 16 and the SDRAM 17 is reduced by about 22% compared to when the amount of information is not reduced.

As the amount of data of the data transferred between the memory controller 16 and the SDRAM 17 is proportional to the power consumption at the interface between them, the power consumption of the imaging system according to the present embodiment is 78% of that of the conventional imaging system in which reduction of the amount of information is not performed. That is, according to the imaging system of the present embodiment, by reducing the amount of information of the raw data by the pre-processing circuit 24, about 22% of the power can be cut compared to the conventional imaging system 200, when displaying the captured image on the liquid crystal display unit 21.

Similarly, when compressing and storing the YC data in the SDRAM 17, the power consumption can be reduced compared to the conventional imaging system.

In the imaging system of the present embodiment, the amount of data of such data is reduced before the data is stored in the memory by the memory controller. Thus, the amount of data transferred between the memory and the memory controller is reduced, and the power consumption at the interface between them can be reduced. As a result, reduction of power consumption and enhancement of processing speed of the imaging system can be achieved.

Further, in the imaging system according to the present embodiment, as the pre-processing circuit includes the gain adjusting circuit, reduction of power consumption and enhancement of processing speed in the imaging system are achieved, and at the same time, the dynamic range of the amount of signal different for each screen is also adjustable.

In the imaging system of the present embodiment, the average signal amount for one screen is controlled by the gain adjusting circuit 26 so as to be constant, but the same effects as the present invention has are also obtained even if the targeting final constant average signal amount is changed using the distribution of signal within the screen, the peak level within the screen, or the condition of the aperture of the optical system.

In the imaging system according to present embodiment, the pre-processing circuit includes the gain adjusting circuit, but may also include other circuits such as a gradation correcting circuit and a compression circuit for reducing the amount of information in addition to the gain adjusting circuit.

In the imaging system, the section for outputting the amount of light converged by the lens as the digital signals is referred to as an imaging device. In FIG. 1, for example, the imaging device refers to the section including the solid-state imaging element, the analog circuit and the A/D conversion circuit. Further, in the imaging system, a device which transfers the signals to and from the memory through the memory controller and processes the digital signals stored in the memory is referred to as a digital signal processor. In FIG. 1, for example, the digital signal processor is the camera signal processing circuit, the compression circuit, and the display circuit.

SECOND EMBODIMENT

An imaging system according to the present embodiment differs from the imaging system according to the first embodiment in that the pre-processing circuit includes a white balance adjusting circuit and a gradation correcting circuit in place of the gain adjusting circuit.

Figure 3:
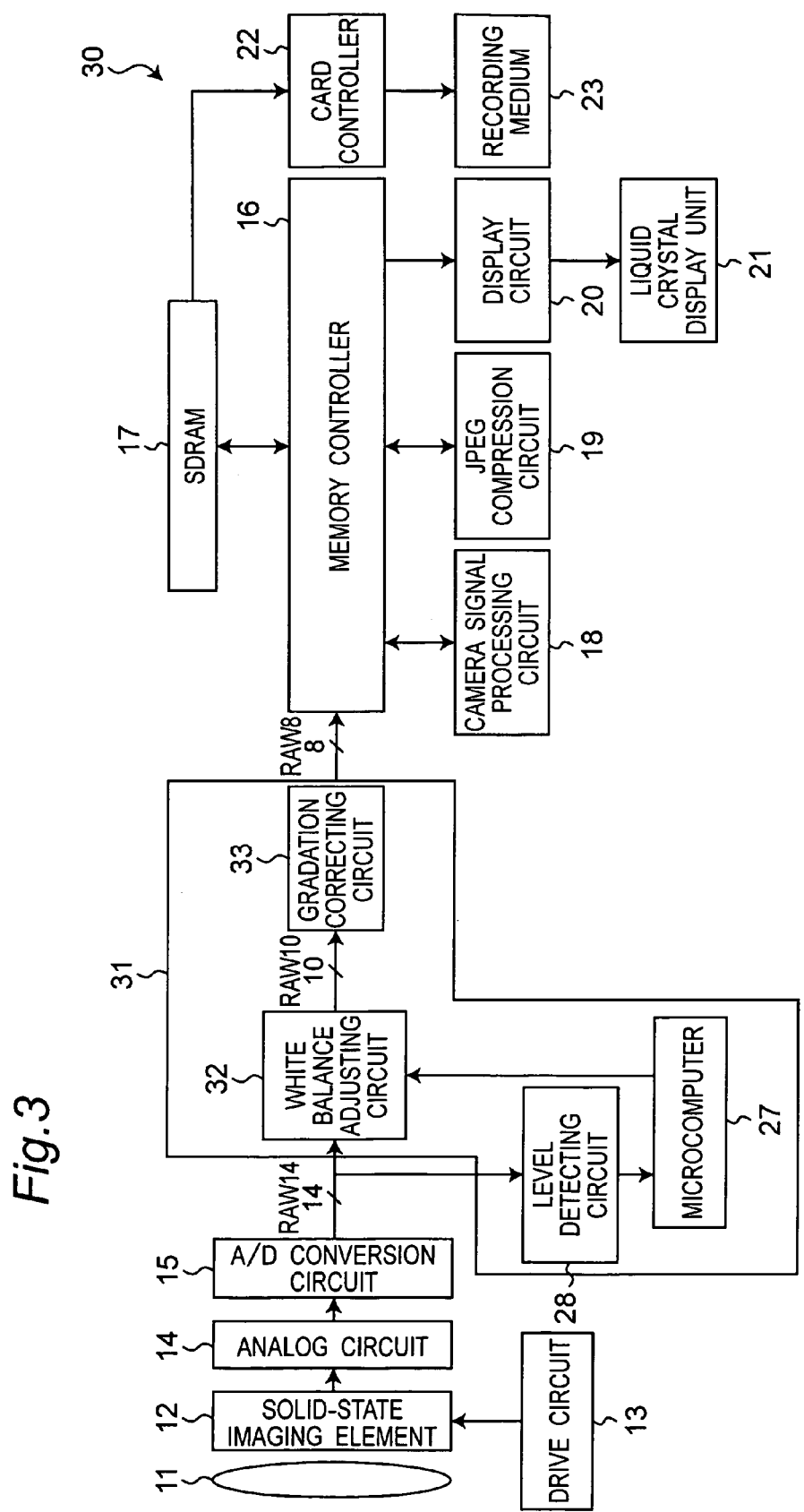
FIG. 3 is a block diagram of a configuration of an imaging system according to a second embodiment.

FIG. 3 is a block diagram of a configuration of the imaging system according to a second embodiment. In FIG. 3, components same as FIG. 1 are given same reference characters. As shown in FIG. 3, in the imaging system 30 according to the present embodiment, the pre-processing circuit 31 includes the information amount reducing circuit having a white balance adjusting circuit 32, a gradation correcting circuit 33, a level detecting circuit 28 and a microcomputer 27. The components denoted with the same reference characters as FIG. 1 are already explained in the first embodiment, and thus the explanation on the configuration and the operation thereof is omitted.

The raw data of 14 bits (RAW 14) output by the A/D conversion circuit 15 is input to the white balance adjusting circuit 32 of the pre-processing circuit 31. The white balance adjusting circuit 32 performs white balance process on the raw data of 14 bits to convert it to raw data of 10 bits (RAW 10). The white balance adjusting circuit 32 outputs the converted 10 bits of raw data to the gradation correcting circuit 33. The gradation correcting circuit 33 performs gamma correction process acting as the gradation correction on the input 10 bits of raw data to convert the 10 bits of raw data to the 8 bits of raw data (RAW 8). The gradation correcting circuit 33 outputs the 8 bits of raw data to the memory controller 16.

The operation of the white balance adjusting circuit 32 will now be explained. The white balance adjustment is adjusting an average signal amount of the signals of R component, that of the signals of G component and that of the signals of B component for one screen obtained when an achromatic subject is captured in such a way that those average signals amounts are the same. The white balance adjusting circuit 32 performs the white balance adjustment on the 14 bits of raw data by the gains applied by the microcomputer 27 to reduce the amount of signal thereof. The calculating method of the gains will now be explained. Raw data of 14 bits (RAW 14) is input to the white balance adjusting circuit 32 and at the same time to the level detecting circuit 28. The level detecting circuit 28 detects the average signal amount of the input raw data for one screen. In the present embodiment, different from the first embodiment, the average signal amount for each of the red (R) component, the green (G) component, and the blue (B) component for one screen are derived. The level detecting circuit 28 outputs detected average signal amount of each color component to the microcomputer 27. The microcomputer 27 calculates gains "Ar", "Ag", and "Ab" so that the average signal amounts of the R component, G component, and B component are equal to one another, which are obtained by multiplying the average signal amount of each of the R component, G component, and B component input to the microcomputer 27, and corresponding one of the gains "Ar", "Ag", and "Ab".

Figure 4:
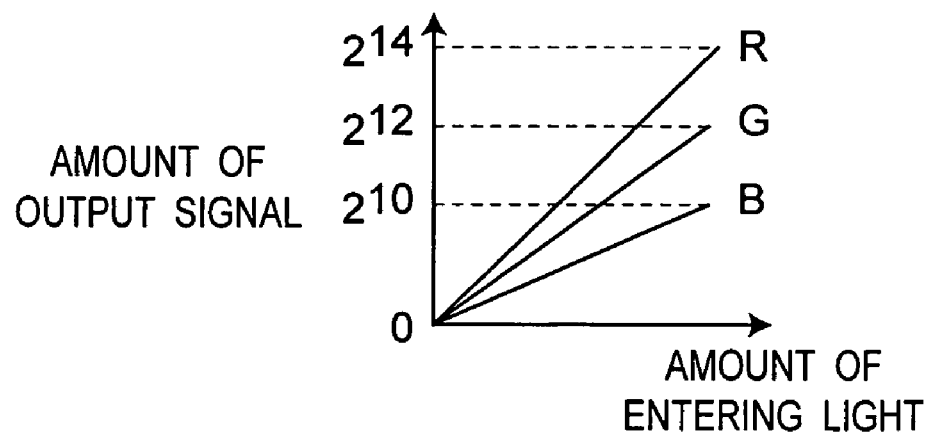
FIG. 4 is a view explaining the operation of a white balance adjusting circuit.

FIG. 4 is a graph showing the range of the amount of light entering the imaging element 12, and the corresponding range of the signal amount of a plurality of digital signals output from the A/D conversion circuit 15 for each of the R component, the B component, and the G component when one screen is input to the imaging system (that is, when one scene is imaged by the imaging system). In FIG. 4, the axis of abscissa shows the amount of light entering the imaging element 12, the axis of ordinate shows the amount of signal of the digital signals output from the A/D conversion circuit 15. In FIG. 4, the signal amount of the R component, that of the G component, and the signal amount of the B component change from 0 to $2^{14}$, from 0 to $2^{12}$, and from 0 to $2^{10}$, respectively, and the average signal amounts detected by the level detecting circuit 28 are $2^{13}$, $2^{11}$, and $2^9$, respectively. The microcomputer 27 calculates the gains "Ar", "Ag", and "Ab" so that the average signal amount of the R component, that of the G component, and that of the B component for one screen are the same. For example, when the signal amounts of the R, G, B components are each in the range shown in FIG. 4, the microcomputer 27 calculates the gains ("Ar", "Ag", "Ab") for the signals of the R component, the signals of the G component and the signals of the B component as $2^{-4}$, $2^{-2}$, and 1, respectively. Here, from Eq. (1), the maximum value of the amount of signal is $2^{10}$, and the average signal amount is $2^9$, with respect to all the color components.

When the raw data is input from the A/D conversion circuit 15, the white balance adjusting circuit 32 performs the white balance process on the raw data and outputs the raw data having smaller amount of information than the raw data input to the white balance adjusting circuit 32.

Figure 5:
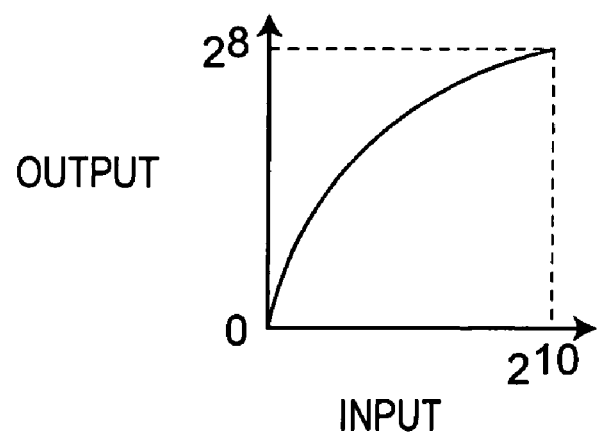
FIG. 5 is a view explaining the operation of a gradation correcting circuit.

The operation of the gradation correcting circuit 33 will now be explained. The gradation correcting circuit 33 converts the input 10 bits of raw data to the 8 bits of raw data (RAW 8) using the non-linear gamma (γ) property as shown in FIG. 5, and outputs the 8 bits of raw data.

As above, by performing the white balance adjustment and the gamma correction, the raw data (RAW 8) in which the amount of signal is reduced from 14 bits to 8 bits, that is by a ratio of 8/14 is stored in the SDRAM 17 by way of the memory controller 16. The subsequent operations of the imaging system are the same as the operations explained in the first embodiment, and thus the explanation thereof is omitted.

The power when the number of bits of the raw data stored in the SDRAM 17 or read from the SDRAM 17 is reduced by a ratio of 8/14 will now be estimated. A case of displaying the captured image on the liquid crystal display unit 21 will now be considered by way of an example. If the number of pixels of the imaging element 12 is five million pixels, similar to the first embodiment, the number of pixels of one horizontal line is 2560 pixels, and the number of pixels per one horizontal line when the YC data (luminance signals of 8 bits, chrominance signals of 8 bits) for displaying is generated by the camera signal processing circuit 18 is 720 pixels. The amount of data of the data transferred between the memory controller 16 and the SDRAM 17 is expressed by the following Eq. (4) per one horizontal line.

$$2560 \text{ pixels} \times 8 \text{ bits} \times 2 + 720 \text{ pixels} \times (8+8) \text{bits} \times 2 = 64000 \text{ bits} \quad (4)$$

On the other hand, when the raw data is 14 bits, the amount of data of the data transferred between the memory controller 16 and the SDRAM 17 is expressed by the above Eq. (3) per one horizontal line.

Referring to Eq. (3) and Eq. (4), since 64000/94720=0.68 is concluded, in the imaging system according to the present embodiment, the amount of data of the data transferred between the memory controller 16 and the SDRAM 17, when the amount of information is reduced, can be reduced by about 32% compared to the conventional imaging system in which the amount of information is not reduced. That is, by performing the white balance adjustment and the gradation correction with the white balance adjusting circuit 32 and the gradation correcting circuit 33, the power consumption can be reduced by about 32% compared to the conventional imaging system 200.

In the imaging system of the present embodiment, the amount of data of such data is reduced before the data is stored in the memory by way of the memory controller. Therefore, the amount of data transferred between the memory and the memory controller is reduced and the power consumption at the interface between them can be reduced. As a result, reduction of power consumption and enhancement of processing speed of the imaging system can be achieved.

Further, in the imaging system of the present embodiment, the pre-processing circuit includes the white balance adjusting circuit and the gradation correcting circuit, and thus reduction of power consumption and enhancement of processing speed in the imaging system are achieved and at the same time, the white balance adjustment and the gradation correction can be performed.

Here, in the present embodiment, the white balance adjustment is performed so that the average signal amounts of the signals of the R component, the G component and the B component for one screen are constant on the assumption that the average signal amounts of the signals of the R component, the G component and the B component for one screen are the same, but the same effects are achieved by changing the targeting constant average signal amount using other color temperature information such as, the distribution of colors within the screen and the value of the aperture of the optical system even if the above assumption is not realized.

In the imaging system of the present embodiment, the pre-processing circuit includes the white balance adjusting circuit and the gradation correcting circuit, but the pre-processing circuit does not necessarily need to include both the white balance adjusting circuit and the gradation correcting circuit at the same time. Even with the pre-processing circuit including the white balance adjusting circuit and not including the gradation correcting circuit, although the reduction amount may be different, the amount of data can be reduced and thus the same effects as the imaging system of the present embodiment has are obtained. Similarly, even if the pre-processing circuit includes the gradation correcting circuit but does not include the white balance adjusting circuit, the amount of data can be reduced and thus the same effects as the imaging system of the present embodiment has are obtained.

THIRD EMBODIMENT

An imaging system according to the present embodiment differs from the imaging system according to the second embodiment in that the pre-processing circuit includes another white balance adjusting circuit in addition to the white balance adjusting circuit and the gradation correcting circuit.

Figure 6:
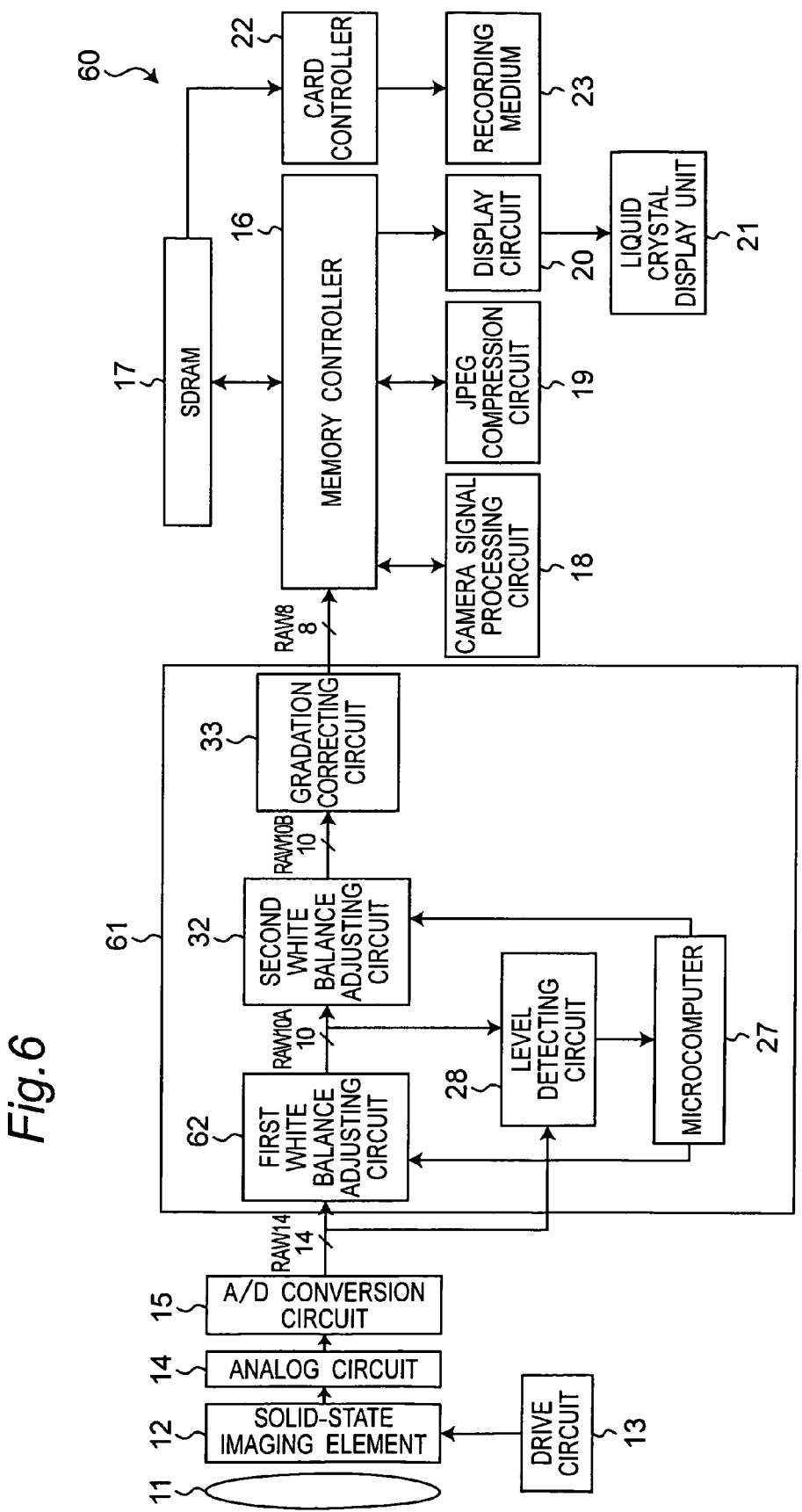
FIG. 6 is a block diagram of a configuration of an imaging system according to a third embodiment.

FIG. 6 is a block diagram showing the configuration of the imaging system according to a third embodiment. In FIG. 6, configurations the same as FIG. 3 are given the same reference characters. As shown in FIG. 6, in a imaging system 60 according to the present embodiment, a pre-processing circuit 61 includes an information amount reducing circuit having a first white balance adjusting circuit 62, the second white balance adjusting circuit 32, a gradation correcting circuit 33, the level detecting circuit 28, and the microcomputer 27. The components given the same reference characters as FIG. 1 and FIG. 3 are already mentioned in the first and second embodiments, and thus the explanation of the configuration and the operation thereof is omitted.

The raw data of 14 bits (RAW 14) output by the A/D conversion circuit 15 is input to the first white balance adjusting circuit 62 of the pre-processing circuit 61. The first white balance adjusting circuit 62 performs white balance process on the raw data input thereto to convert it to the 10 bits of raw data (RAW 10A), and outputs the 10 bits of raw data. The first white balance adjusting circuit 62 performs white balance process using gains that allow white balance to be obtained for a light source of a specific color temperature ($T_0$). The gains are derived using the level detecting circuit 28 and the microcomputer 27 from the raw data obtained by performing imaging under the light source of color temperature $T_0$ in the adjusting step before shipment to the factory. After the imaging system 60 is shipped, the first white balance adjusting circuit 62 fixes gains to the gains obtained by capturing before shipment and performs white balance adjustment using the fixed gains. Here, the color $T_0$ temperature is preferably an intermediate value (e.g., 4500K) of a color temperature distribution range (2500to 8000K) of a light source.

Next, the 10 bits of raw data (RAW 10A) output from the first white balance adjusting circuit 62 is input to the second white balance adjusting circuit 32. The second white balance adjusting circuit 32 performs white balance adjustment on the 10 bits of raw data (RAW 10A) input thereto using the gain for the white balance in correspondence to the light source during imaging, and outputs the 10 bits of raw data (RAW 10B). The raw data (RAW 10B) performed with the white balance adjustment as above is input to the gradation correcting circuit 33. The gradation correcting circuit 33 performs γ correction acting as the gradation correction on the raw data (RAW 10B), and outputs the resultant 8 bits of raw data (RAW 8).

The reasons for performing the white balance adjustment on the raw data output from the A/D conversion circuit 15 in two-stages will now be explained. The spectral characteristics of the imaging element are not necessary constant as the different elements have different sensitivities. For example, the gain of the white balance may differ by about 10% between elements even with the same light source. In the imaging system of the present embodiment, an affect of variation in sensitivity can be reduced with the first white balance adjusting circuit 62.

Figure 7:
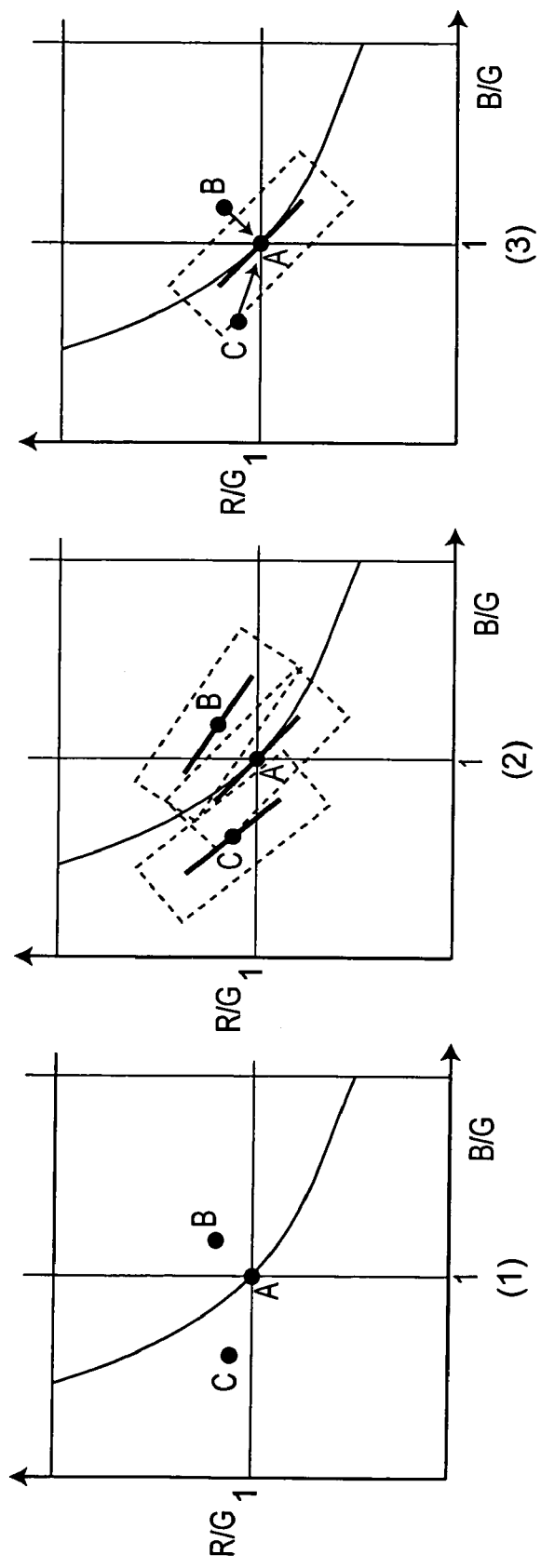
FIG. 7 is a view showing white balance adjusting points of imaging elements having different sensitivity.

FIG. 7 is a graph showing the distribution of white balance adjusting points with respect to the imaging element "A", the imaging element "B", and the imaging element "C" having different sensitivity when they are used. FIG. 7 (1) shows white balance adjusting points of imaging elements "A", "B", and "C" when they are used under the light source having the color temperature of 4500. FIG. 7 (2) is that similar to the graph shown in FIG. 7 (1), but in addition, includes the white balance adjustment range (heavy line) and the white balance detection range (broken line) for the imaging elements "A", "B", and "C". FIG. 7 (3) shows the white balance adjustment range and the detection range of the white balance when the white balance adjusting points of the imaging elements "A", "B", and "C" are coincided. In the graphs shown in (1), (2), and (3) of FIG. 7, the axis of ordinate shows R/B, and the axis of abscissa shows B/G, and the curve in the figure shows the distribution of the light source. Here, R, G and B are values of the average signal amounts of the signals of the R component, the G component and the B component obtained when imaging the achromatic subject under a certain light source with the imaging element. Thus, the part near the upper left of the curve in the figure corresponds to the light source such as halogen light (electric lamp) having a relatively large amount of R component, the central part corresponds to the fluorescent lamp, and the part near the lower right corresponds to the outdoor light or light source under cloudy weather having a relatively large amount of B component. The white balance adjusting point is distributed at the upper left part of FIG. 7 when the achromatic subject is, for example, captured under the halogen light source (large amount of R component, small amount of B component), and the white balance adjusting point is distributed at the lower right part of FIG. 7 when the achromatic subject is imaged under cloudy weather (large amount of B component, small amount of R component).

Here, the white balance adjustment is the adjustment to have the average signal amounts of the R component, the G component and the B component obtained as above to the same using the gain. Thus, even the image taken under a yellow electric lamp, for example, may be converted to the image of preferable color reproduction as if taken outdoors.

FIG. 7 (1) shows the white balance adjusting points when the imaging elements "A", "B", and "C" are used under the light source having a color temperature of 4500K. As shown in FIG. 7 (1), the white balance adjusting point when the imaging element "A" is used is on the curve, but the white balance adjusting points when the imaging elements B, C are used are not on the curve, and are at slightly shifted positions. This is because the each imaging element's property of sensing the light of each of the R component, the G component, and the B component, that is, each imaging element's spectral characteristic is different even when the same light source having a color temperature of 4500K is used. Therefore, under the light source having a color temperature of 4500K, the ratio of the gain given to each signals of the R component, the G component, and the B component is R:G:B=1:1:1 when the imaging element "A" is used, whereas when the imaging element "B" and the imaging element "C" are used, the ratio is R:G:B=0.8:1:1 and R:G:B=0.9:1:1.8, respectively.

FIG. 7 (2) shows the white balance adjustment range (heavy line) and the white balance detection range (broken line) of the imaging elements "A", "B", and "C". In the imaging system, in case of the automatic white balance mode, the light source is automatically determined and the gain for the best white balance adjustment is set. The white balance adjustment range and the white balance detection range will now be explained. The white balance adjustment range (heavy line) of each of the imaging elements is the distribution of the white balance adjusting point when for example, performing capturing within the range from the halogen light source to the cloudy weather using such imaging element. The white balance detection range is set in the following way. In the white balance of the imaging system, the light source is generally determined from the average color distribution of the image being captured, but since the subject is not guaranteed to be achromatic, the light source is concluded from the image signals possibly being achromatic. Here, the signals within the white balance detection range are considered as image signals likely to be achromatic, and only the image signals within the white balance detection range (broken line) are collected. And an average value of the signal amount of the image signals corresponding to each color component is obtained, and the signals of the average value, which light source determination is go by, is obtained. When taking the difference in the sensitivity of the imaging element into consideration, the adjustment range and the detection range of the white balance must be adjusted for each element in case of performing the white balance adjustment. The adjustment of such adjustment range and the detection range makes the adjusting step of the product complicating, and makes the software of the white balance adjustment complex.

In the imaging system according to the present embodiment, the adjusting points of white balance at the color temperature of 4500K become the same for all of the imaging elements having different sensitivity by the first white balance adjusting circuit 62. That is, a constant gain is not applied on all the imaging elements with respect to one color temperature (4500K), the gain of R:G:B=1:1:1 is applied on the imaging element "A", and the gains R:G:B=0.8:1:1 and R:G:B=0.9:1:1.8 are applied on the imaging element "B" and the imaging element "C", respectively, with respect to it. Thus, as shown in FIG. 7 (3), each of the white balance adjustment range and the white balance detection range can be limited to only one. Therefore, when performing the white balance adjustment by the second white balance adjusting circuit 32 in the same conditions as the conditions when the image was captured, the white balance adjustment can be performed using the limited white balance adjustment range and the detection range without taking the difference in sensitivity of the imaging element into consideration.

The imaging system according to the present embodiment reduces the amount of data of the raw data, similar to the imaging system according to the second embodiment. Therefore, the imaging system 60 can reduce the power consumption by about 32% compared to the conventional imaging system 100.

In the imaging system according to the present embodiment, before the data is stored in the memory by the memory controller, the amount of data of such data is reduced. Thus, the amount of data transferred between the memory and the memory controller is reduced, and the power consumption at the interface between them can be reduced. As a result, the reduction of power consumption and enhancement of processing speed of the imaging system are achieved.

In the imaging system according to the present embodiment, as the pre-processing circuit includes the white balance adjusting circuit and the gradation correcting circuit, reduction of power consumption and enhancement of processing speed in the imaging system are achieved, and at the same time, the white balance adjustment and the gradation correction can be performed.

Further, the imaging system according to the present embodiment can reduce the affect by the variation in sensitivity of the imaging element, and can make the design and adjustment of the camera system easier.

In the imaging system according to the present embodiment, the pre-processing circuit includes the first white balance adjusting circuit, the second white balance adjusting circuit, and the gradation correcting circuit, but the pre-processing circuit does not necessarily need to include the gradation correcting circuit. Even with the pre-processing circuit including the first white balance adjusting circuit and the second white balance adjusting circuit but not including the gradation correcting circuit, although there is difference in the reducing amount, the amount of data can be reduced, and the same effects as the imaging system according to the present embodiment has are obtained.

FOURTH EMBODIMENT

An imaging system according to the present embodiment differs from the imaging system according to the third embodiment in that the pre-processing circuit includes a compression circuit in addition to the first white balance adjusting circuit, the gradation correcting circuit and the second white balance adjusting circuit. The amount of information of the raw data is reduced by the compression process performed at the compression circuit.

Figure 8:
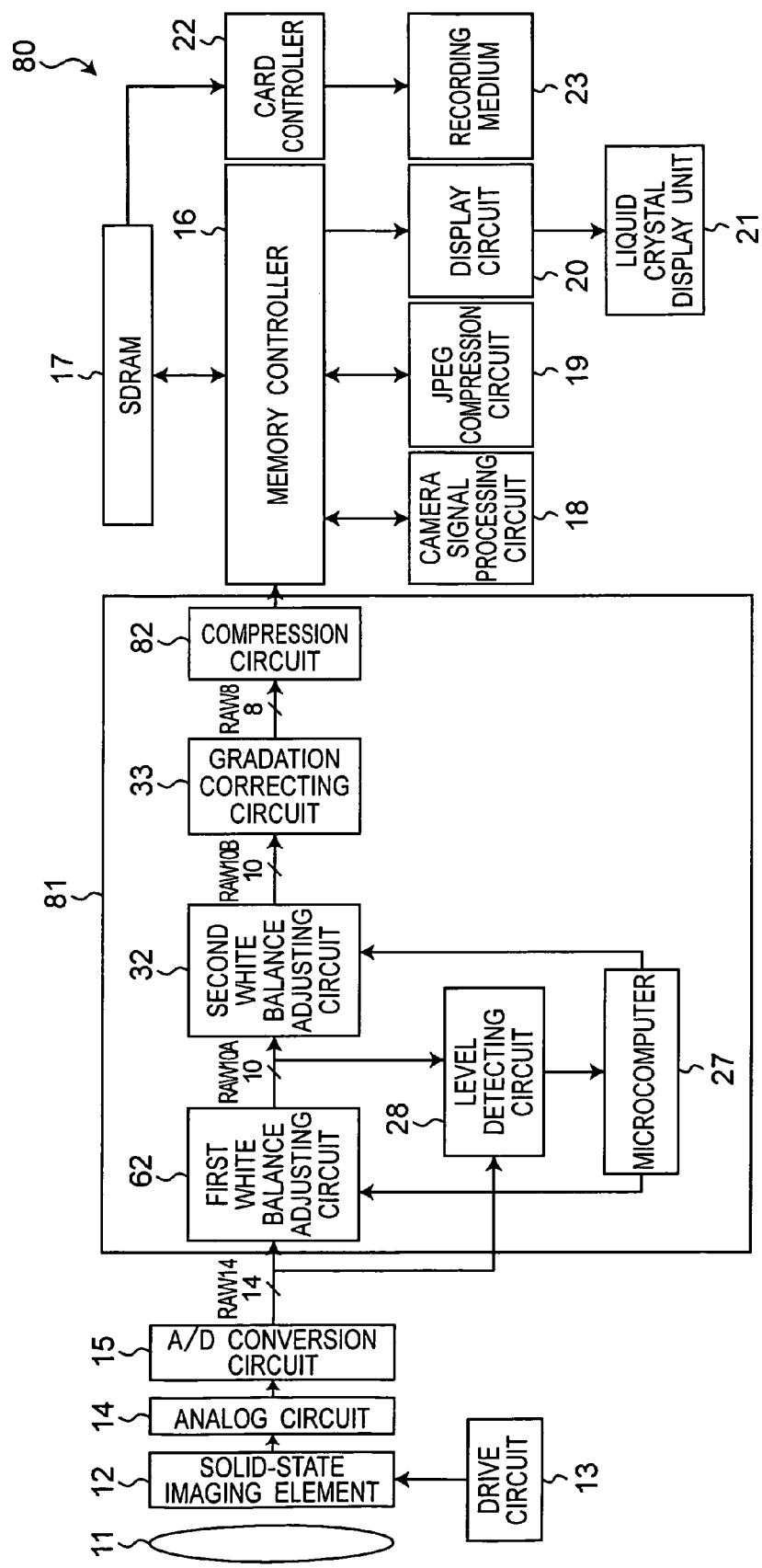
FIG. 8 is a block diagram of a configuration of an imaging system according to a fourth embodiment.

FIG. 8 is a block diagram of a configuration of the imaging system according to a fourth embodiment. In FIG. 8, the same reference characters are denoted for the configuration same as FIG. 6. As shown in FIG. 8, in the imaging system 80 according to the present embodiment, a pre-processing circuit 81 includes the information amount reducing circuit having the first white balance adjusting circuit 62, the second white balance adjusting circuit 32, the gradation correcting circuit 33, a compression circuit 82, the level detecting circuit 28 and the microcomputer 27. The components given the same reference characters as FIG. 1, FIG. 3 and FIG. 6 are already explained in the first to third embodiments and thus the explanation of the configuration and the operation thereof is omitted.

The 8 bits of raw data (RAW 8) output from the gradation correcting circuit 33 is input to the compression circuit 82. The compression circuit 82 performs a compression process according to Adaptive Differential Pulse Code Modulation (ADPCM) on the 8 bits of raw data (RAW 8). The ADPCM here for example, collects the signals of the same color component among the raw data (RAW 8) by 8 pixels, expresses a value of amount of signal of each pixel following a head pixel as the difference between the value and a value (head value) of amount of signal of the head pixel, and converts the format of the raw data to the format of the data of the head value and the difference. For instance, if the head value is 8 bits, and each difference is 6 bits, the amount of data for every 8 pixels is 8+6×7=50, and the amount of data can be reduced compared to 8×8=64 before compression. Further, the amount of data for every 8 pixels is reduced from 112 bits (=14 bits×8 pixels), in the case of the conventional imaging system in which the pre-processing is not performed, to 50 bits. Here, the signals are collected by the same color component because the signals of the same color component have high correlation in the vicinity. Further, the signals are collected by 8 pixels because, when using only one part of raw data in the camera signal process, it takes a long time to acquire the desired data if the number of pixels for which the differences between its signal amount value and the head value need to be calculated is large.

The subsequent operations of the imaging system are the same as the operations explained in the first embodiment and thus the explanation thereof is omitted. Note that in the imaging system according to the present embodiment, the camera signal processing circuit requires a decompression circuit for decompressing the raw data compressed by ADPCM.

The power when the number of bits of the raw data output from the pre-processing circuit is reduced by a ratio of 8/14 and compressed will now be estimated. A case of displaying the captured image on the liquid crystal display unit 21 will now be considered by way of an example. In the imaging system according to the present embodiment, when the raw data is input to the camera signal processing circuit 18, the camera signal processing circuit 18 decompresses the compressed raw data, and generates the YC data. For example, if the number of pixels of the solid-state imaging element 12 is five million pixels, the number of pixels of one horizontal line is 2560 pixels. The number of pixels per one horizontal line when the YC data (luminance signals of 8 bits, chrominance signals of 8 bits) for displaying is generated by the camera signal processing circuit 18 is then 720 pixels. In this case, the amount of data of the data transferred between the memory controller 16 and the SDRAM 17 is expressed by the following Eq. (5) per one horizontal line.

$$2560 \text{ pixels} \times 1/8 \times 50 \text{ bits} \times 2 + 720 \text{ pixels} \times (8+8) \text{bits} \times 2 = 55040 \text{ bits} \quad (5)$$

On the other hand, if the raw data remains 14 bits and is not compressed, the amount of data of the data transferred between the memory controller 16 and the SDRAM 17 is expressed by the above Eq. (3) per one horizontal line.

Referring to Eq. (3) and Eq. (5), since 55040/94720=0.58 is concluded, in the imaging system according to the present embodiment, the amount of data of the data transferred between the memory controller 16 and the SDRAM 17 is reduced by about 42% compared to that in the conventional imaging system 200. That is, by performing the white balance adjustment, the gradation correction and the compression process in the pre-processing circuit, the imaging system 80 can reduce the power consumption by about 42% compared to the conventional imaging system 200.

In the imaging system according to the present embodiment, the amount of data of the data is reduced before the data is stored in the memory by the memory controller. Thus, the amount of data transferred between the memory and the memory controller is reduced, and the power consumption at the interface between them can be reduced. As a result, the reduction of power consumption and the enhancement of processing speed of the imaging system are achieved.

In the imaging system according to the present embodiment, the pre-processing circuit includes the white balance adjusting circuit and the gradation correcting circuit, and thus reduction of power consumption and enhancement of processing speed in the imaging system are achieved, and at the same time, the white balance adjustment and the gradation correction can be performed.

In the imaging system according to the present embodiment, the ADPCM method is used as the compression method by the compression circuit, but the same effects can also be obtained using other compression methods.

Further, in the imaging system according to the present embodiment, the compression ratio of the compression circuit serving as the pre-processing circuit is about 1/2, but if the compression ratio is increased, the effect of reducing the power consumption is of course increased. However, in this case, the quality of the image degrades. On the other hand, if the compression method is not a lossy compression method such as ADPCM, but a lossless compression method, the degradation of the image quality can be avoided. However, in this case, either increasing the compression ratio becomes difficult, or handling of the raw data becomes complicating.

In the imaging system according to the present embodiment, the compression circuit serving as the pre-processing circuit performs compression into signals of a fixed length. This is to allow easy recognition where necessary data is located on the SDRAM when, for example, using only one part of the raw data. By performing coding into variable length instead of fixed length, the compression ratio can be increased. However, in this case, the configuration of the memory controller becomes complex.

In the imaging system according to the present embodiment, the pre-processing circuit includes the first white balance adjusting circuit, the second white balance adjusting circuit, the gradation correcting circuit, and the compression circuit, but even if the pre-processing circuit includes the compression circuit but does not include the white balance circuits and the gradation correcting circuit, although there is difference in the reducing amount, the amount of data can be reduced, and thus the same effects as the imaging system according to the present embodiment has are obtained.

The same effects are also obtained when the compression circuit is included in the pre-processing circuit of the imaging systems according to all of the above mentioned embodiments.

FIFTH EMBODIMENT

An imaging system according to the present embodiment sets a mode of the signal processing by a mode setting circuit, and controls the function of the pre-processing circuit in accordance with the set mode by a function control circuit to reduce the power consumption and at the same time perform a process corresponding to the mode. More specifically, the process can be performed by focusing on the reduction of power consumption when taking a moving image, and focusing on the quality of an image when taking a still image.

Figure 9:
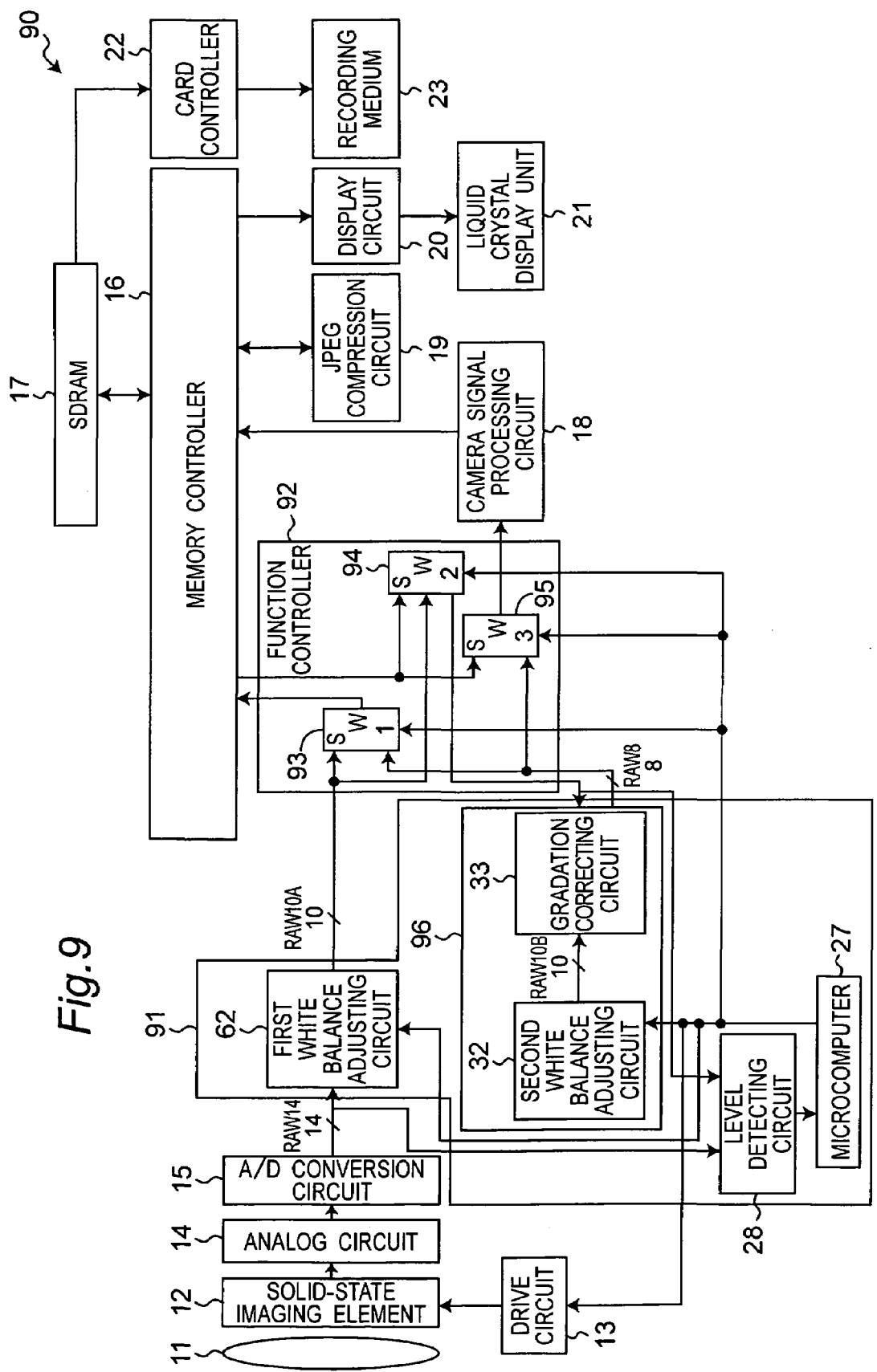
FIG. 9 is a block diagram of a configuration of an imaging system according to a fifth embodiment.

FIG. 9 shows the configuration of the imaging system according to a fifth embodiment. As shown in FIG. 9, the imaging system 90 includes the optical lens 11, the solid-state imaging element 12, the drive circuit 13 of the solid-state imaging element 12, the analog circuit 14, the A/D conversion circuit 15, the memory controller 16, the SDRAM 17 serving as a memory circuit, the camera signal processing circuit 18, the JPEG compression circuit 19, the display circuit 20, the liquid crystal display unit 21, the card controller 22, the recording medium 23, a pre-processing circuit 91 and a function control circuit 92. The pre-processing circuit 91 includes the information amount reducing circuit having the first white balance adjusting circuit 62, the second white balance adjusting circuit 32, the gradation correcting circuit 33, the level detecting circuit 28 and the microcomputer 27. The function control circuit 92 includes three switches 93, 94, and 95 which can switch the input signals input to other components according to the set mode. The imaging system 90 according to the present embodiment differs from the imaging system according to the above mentioned embodiments in that the function control circuit 92 is provided. Here, the second white balance adjusting circuit 32 and the gradation correcting circuit 33 configure a partial information amount reducing circuit 96. Further, the microcomputer 27 is configured to also function as the mode setting circuit. The microcomputer 27 is able to perform setting of the mode to the drive circuit 13 and the switch 93 (SW1), the switch 94 (SW2), and the switch 95 (SW3) of the function control circuit 92. The components given the same reference characters as FIG. 1, FIG. 3, FIG. 6 and FIG. 8 are already mentioned in the first to fourth embodiments, and thus the explanation of the configuration and the operation thereof is omitted.

The operation of the imaging system 90 will now be explained. First, the moving image mode will be explained. The microcomputer 27 operating as the mode setting circuit performs setting of the moving image mode to the drive circuit 13, and the switches 93, 94, 95 of the function control circuit 92. When light enters through the optical-lens 11, the light is photoelectrically transferred by the solid-state imaging element 12. The drive circuit 13 drives the solid-state imaging element 12 in the moving image mode. Next, output signals of the solid-state imaging element 12 are processed by an analog circuit 14, and the analog signals are converted to digital signals by the A/D conversion circuit 15. The raw data of 14 bits (RAW 14) obtained through A/D conversion is input to the first white balance adjusting circuit 62. The first balance adjusting circuit 62, similar to the third embodiment, converts the 14 bits of raw data to the 10 bits of raw data (RAW 10A) by white balance adjustment and outputs the 10 bits of raw data. The first white balance adjusting circuit 62 further performs light source information extraction process, calculation of gain and so on, on the input raw data (RAW 14). The raw data (RAW 10A) output from the first white balance adjusting circuit 62 is input to the function control circuit 92. Here, the function control circuit 92 is set to the moving image mode by the microcomputer 27 operating as the mode setting circuit. In the moving image mode, the raw data (RAW 10A) input from the first white balance adjusting circuit 62 to the function control circuit 92 is input to the partial information amount reducing circuit 96 including the second white balance adjusting circuit 32 and the gradation correcting circuit 33 via the switch 94 (SW2).

The raw data (RAW 10A) input to the partial information amount reducing circuit 96 is subjected to white balance adjustment by the second white balance adjusting circuit 32. Here, white balance information such as light source information used in this white balance adjustment is the information on another raw data input to the first white balance adjusting circuit 62 immediately before the point when the raw data (RAW 10A) input to the partial information amount reducing circuit 96 is input to the first white balance adjusting circuit 62 before it is white balance adjusted by the first white balance adjusting circuit 62. The second white balance adjusting circuit 32 performs the white balance adjustment, similar to the third embodiment, on the input raw data and outputs the resultant raw data (RAW 10B). The raw data (RAW 10B) output from the second white balance adjusting circuit 32 is input to the gradation correcting circuit 33, and is performed with the gamma correction process by the gradation correcting circuit 33. Therefore, the partial information amount reducing circuit 96 outputs the 8 bits of raw data (RAW 8). The raw data (RAW 8) output from the partial information amount reducing circuit 96 is input to the function control circuit 92 and output to the memory controller 16 by way of the switch 93 (SW1). The memory controller 16 stores the raw data (RAW 8) in the DRAM 17.

Next, the memory controller 16 reads the raw data stored in the SDRAM 17 and outputs such raw data to the function control circuit 92. The function control circuit 92 is set to the moving image mode, and thus transfers the raw data (RAW 8) input from the memory controller 16 to the camera signal processing circuit 18 by way of the switch 95 (SW3). The camera signal processing circuit 18 performs the camera signal process on the transferred raw data (RAW 8) and converts the raw data (RAW 8) to the YC data (YC) expressed by the luminance signals (Y) and the chrominance signals (C). The memory controller 16 reads the converted YC data from the camera signal processing circuit 18 and again stores such YC data to the SDRAM 17. The subsequent operations of the imaging system are the same as the operations explained in the first embodiment, and thus the explanation thereof is omitted.

In the above mentioned moving image mode, the power consumption in the imaging system 90 is reduced by about 32% similar to that in the imaging system 60 according to the third embodiment.

In the white balance adjustment, the gain adjustment is desirably performed on raw data using the white balance information of the input raw data. However, to extract the light source information from the raw data, some time is required to retrieve the raw data corresponding to one screen. In case of capturing moving image, the raw data is sequentially input into the white balance adjusting circuit (e.g., raw data corresponding to 30 images is input in one second). Thus, while the light source information is being extracted, the gain is being calculated and etc. with respect to the raw data, the next raw data is input to the white balance adjusting circuit. Therefore, in the moving image mode, when white balance adjustment of raw data is performed, the white balance process is performed to the raw data using the light source information of another raw data obtained immediately before the raw data to which the white balance process is performed is obtained in the imaging system (e.g., when retrieving raw data corresponding to 30 images in one second, using the light source information of another raw data input ⅓₀ second before). In the imaging system 90 according to the present embodiment, in the moving image mode, the white balance information acquired by the first white balance adjusting circuit 62 is used when the next raw data (RAW 14) input to the first white balance is white balance adjusted by the second white balance adjusting circuit 32 after it is subsequently input to the second white balance adjusting circuit 32.

The operation of the still image mode will now be explained. The microcomputer 27 serving as a mode setting circuit performs the setting of the still image mode on the drive circuit 13 and the switches 93, 94, 95 of the function control circuit 92. When light enters the optical lens 11, the light is photoelectrically transferred by the solid-state imaging element 12. The drive circuit 13 drives the solid-state imaging element 12 in the still image mode. The output signals of the solid-state imaging element 12 are then processed by the analog circuit 14, and the analog signals are converted to digital signals in the A/D conversion circuit 15. The A/D converted 14 bits of raw data (RAW 14) is input to the first white balance adjusting circuit 62. Similar to the third embodiment, the first white balance adjusting circuit 62 converts the 14 bits of raw data to the 10 bits of raw data (RAW 10A) by the white balance adjustment, and outputs the 10 bits of raw data. The first white balance adjusting circuit 62 also performs light information extraction, gain calculation and so on, on the input raw data (RAW 14). The raw data (RAW 10A) output from the first white balance adjusting circuit 62 is input to the function control circuit 92. Here, the function control circuit 93 is set to the still image mode by the microcomputer 27 serving as the mode setting circuit. In the still image mode, the raw data (RAW 10A) input from the first white balance adjusting circuit 62 is input to the memory controller 16 by way of the switch 93 (SW1). The memory controller 16 stores the raw data (RAW 10A) in the SDRAM 17.

Next, the memory controller 16 reads the raw data (RAW 10A) stored in the SDRAM 17 and outputs such raw data to the function control circuit 92. Here, the function control circuit 92 is set to the still image mode by the microcomputer 27 serving as the mode setting circuit. In the still image mode, the raw data (RAW 10A) input from the first white balance adjusting circuit 62 to the function control circuit 92 is input to the partial information amount reducing circuit 96 by way of the switch 94 (SW2) The 10 bits of raw data (RAW 10) input to the partial information amount reducing circuit 96 is subjected to the white balance adjustment by the second white balance adjusting circuit 32. Here, the white balance information such as light source information used in the white balance adjustment to the raw data is the white balance information acquired by the first white balance adjusting circuit 62 when the raw data is input to the first white balance adjusting circuit 62. After performing the white balance adjustment on the input raw data as described in the third embodiment, the second white balance adjusting circuit 32 outputs the white balance adjusted raw data to the gradation correcting circuit 33. The gradation correcting circuit 33 converts the input raw data to 8 bits of raw data (RAW 8) by gamma correction process and outputs the relevant raw data. The 8 bits of raw data (RAW 8) output from the partial information amount reducing circuit 96 is input to the function control circuit 92. Since the function control circuit 92 is set to the still image mode, the input 8 bits of raw data is transferred to the camera signal processing circuit 18 by way of the switch 95 (SW3). The camera signal processing circuit 18 performs camera signal process on the transferred raw data, and converts the input raw data to the YC data (YC) expressed by the luminance signals (Y) and the chrominance signals (C). The memory controller 16 reads the converted YC data from the camera signal processing circuit 18 and again stores such YC data in the SDRAM 17. The subsequent operations of the imaging system are the same as the operations explained in the first embodiment, and thus the explanation thereof is omitted.

In the still image mode, the raw data (RAW 10A) is stored in the SDRAM 17 before the amount of information thereof is reduced to 8 bits. Thus, the power consumed by the imaging system 91 is reduced by about 22% compared to the conventional imaging system, as described in the first embodiment.

In the still image mode, the white balance adjustment is performed to raw data output from the A/D conversion circuit 15 after it is stored once in the SDRAM 17. Thus, while light source information extraction, gain calculation and so on are performed with respect to the raw data input to the first white balance adjusting circuit 62 therein, the raw data is stored in the SDRAM 17, and read from the SDRAM 17. And, using the gain and the like calculated in the first white balance adjusting circuit 62, the white balance adjustment is performed on the raw data in the second white balance adjusting circuit 32. Therefore, from when the raw data is input to the first white balance adjusting circuit 62 until it is output from the third white balance adjusting circuit 32, it is possible to calculate values set for white balance for the raw data, and white balance adjustment can be performed on the input raw data using the information thereof. Therefore, high-quality image with satisfactory white balance precision can be obtained.

In the white balance adjustment, the gain adjustment is desirably performed on raw data using the information thereof. In the above mentioned still image mode, a white balance gain for raw data is calculated using the light source information extracted from the raw data for one screen, and the white balance adjustment can be performed on the retrieved raw data for one screen using such white balance gain.

In the camera which captures a still image such as a digital camera, the white balance adjustment is desirably performed on raw data using the white balance information (light source information and the like) of the raw data. In the imaging system according to the present embodiment, the white balance adjustment can be performed on retrieved raw data using the white balance information of the retrieved raw data when the still image is captured. On the other hand, in case of the moving image, since the image of the subject is continuously retrieved into the imaging system in a short period of time, a problem does not arise even if the white balance adjustment is performed on raw data of the retrieved image using the white balance information of another raw data of the image retrieved into the imaging system just before. Particularly, in case of the still image, constraints on the processing time is loose compared to the moving image that requires repeated processes, and thus the quality of the image is more focused on rather than the reduction of power consumption. The imaging system according to the present embodiment can perform the processes corresponding to the photographing mode, and performs processes with focus on the reduction of the power consumption in the motion image photographing mode, and with focus on the quality of the image in the still image photographing mode.

The imaging systems according to a sixth embodiment to a tenth embodiment explained below include the pre-processing circuit between the A/D conversion circuit and the memory controller, which pre-processing circuit includes a thinning out circuit which thins out the raw data output from the A/D conversion circuit. These imaging systems attempt to reduce the power consumption at the interface of the SDRAM and the memory controller by reducing the number of data by thinning out the raw data by the thinning out circuit, and consequently reducing the amount of data of the raw data.

SIXTH EMBODIMENT

Figure 10:
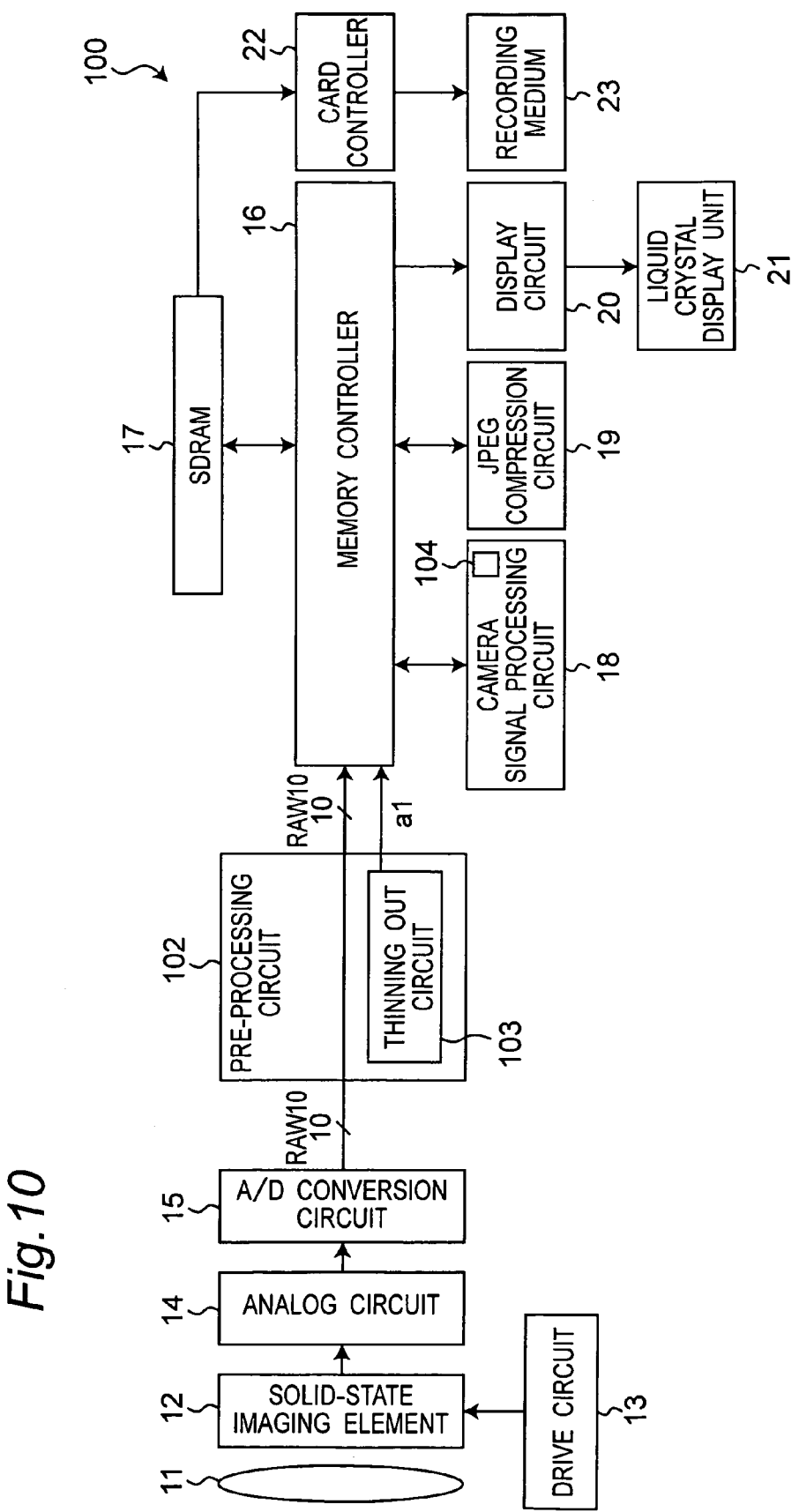
FIG. 10 is a block diagram of a configuration of an imaging system according to a sixth embodiment.

FIG. 10 is a block diagram of a configuration of an imaging system according to a sixth embodiment of the present invention. In FIG. 10, components same as the imaging system of FIG. 1 are given the same reference characters and thus the explanation thereof is omitted. As shown in FIG. 10, the pre-processing circuit 102 in the imaging system 100 includes a thinning out circuit 103. Further, the camera signal processing circuit 18 includes a zoom processing circuit 104. The pre-processing circuit 102 is connected to the A/D conversion circuit 15 to receive the signals output from the A/D conversion circuit 15 and output them. Here, the pre-processing circuit 102 is not intended to reduce the information amount of each of the signals. For instance, if the amount of information of each of the signals output from the A/D conversion circuit 15 is 10 bits, the amount of information of the raw data output from the pre-processing circuit 102 remains as 10 bits.

Figure 11:
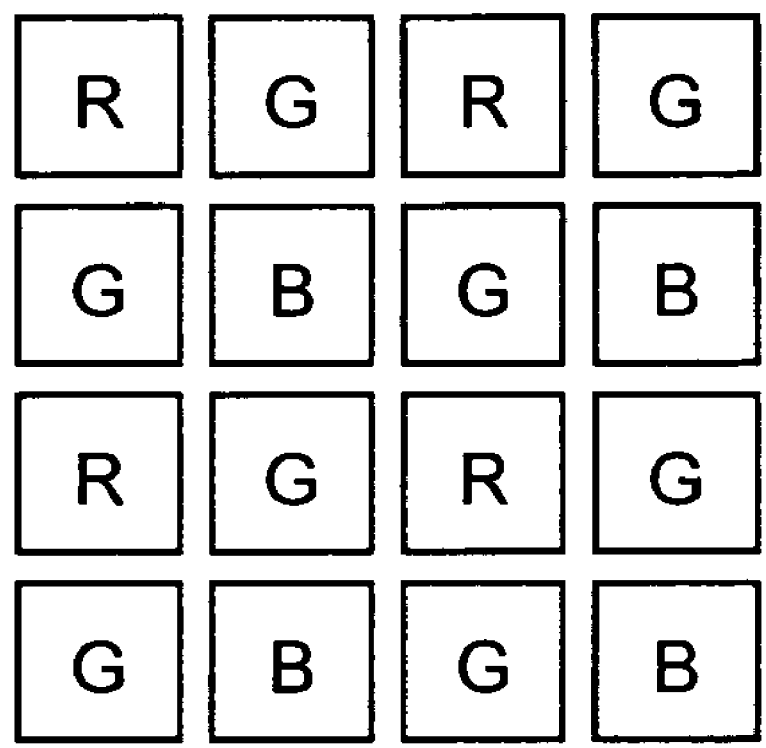
FIG. 11 is a view showing one example of the arrangement of color filters provided in each pixel of the solid-state imaging element.

The solid-state imaging element 12 is for example, a charge coupled element (hereinafter referred to as "CCD"). The solid-state imaging element 12 has a plurality of pixels arranged in two dimensions. For instance, if the number of pixels of the solid-state imaging element 12 is five million pixels, the number of effective pixels is 2560 pixels in the horizontal direction, and there are 1920 lines in the vertical direction. Further, the solid-state imaging element 12 includes photodiodes each of which corresponds to each pixel one by one. One of the red filter, the green filter and the blue filter is arranged on each of the photodiode. FIG. 11 shows one example of the arrangement of the color filter arranged on each pixel of the imaging element 12. FIG. 11 shows a partial arrangement (arrangement of four-by-four). The entire color filter is a collection of a plurality of such partial arrangement. In FIG. 11, R indicates the red filter, G indicates the green filter and B indicates the blue filter. As shown in FIG. 11, the arrangement of the color filters in the imaging element 12 is configured by having a horizontal line in which the red filter (R) and the green filter (G) are alternately arranged in the horizontal direction, and a horizontal line in which the green filter (G) and the blue filter (B) are alternately arranged in the horizontal direction alternately lined in the vertical direction.

When the imaging element 12 is irradiated with light, the imaging element 12 generates an electric signal for each pixel. The A/D conversion circuit 15 then outputs the digital data (hereinafter referred to as "pixel data") corresponding to each of the pixels. Here, the pixel data corresponding to the pixel with the red filter in the imaging element 12 is the R data, the pixel data corresponding to the pixel with the green filter is the G data and the pixel data corresponding to the pixel with the blue filter is the B data.

Figure 12:
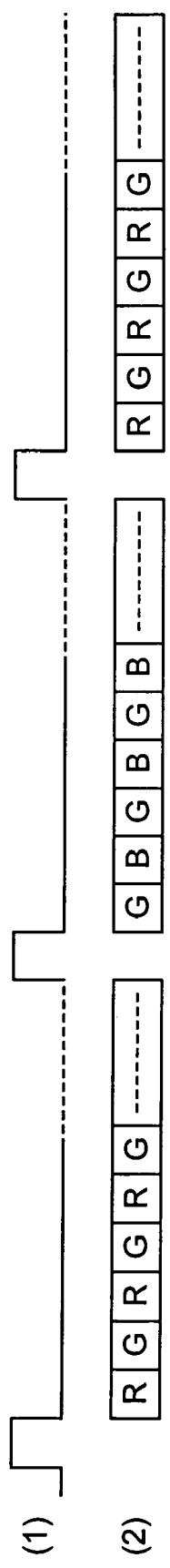
FIG. 12 is a timing chart showing the raw data output by an A/D conversion circuit when the color filters of the solid-state imaging element are arranged as in FIG. 11.

FIG. 12 is a timing chart showing the digital signals (raw data) output by the A/D conversion circuit 15 when the color filters of the imaging element 12 are arranged as shown in FIG. 11. FIG. 12 (1) shows a horizontal synchronization signal, and FIG. 12 (2) shows the raw data. The A/D conversion circuit 15 outputs the pixel data corresponding to a plurality of pixels in the horizontal line for every pixel arrangement (horizontal line) in the horizontal direction in the imaging element 12. Here, regarding the arrangement of the color filters shown in FIG. 11, the horizontal line in which the red filter (R) and the green filter (G) are alternately arranged and the horizontal line in which the green filter (G) and the blue filter (B) are alternately arranged are alternately lined in the vertical direction. Thus, the A/D conversion circuit 15 alternately repeats the operation of outputting the R data (shown as "R" in FIG. 12) and the G data (shown as "G" in FIG. 12) alternately, and the operation of outputting the G data and the B data (shown as "B" in FIG. 12) alternately, as shown in FIG. 12. Theses operations are switched by the horizontal synchronization signal. The raw data output from the A/D conversion circuit 15 is input to the pre-processing circuit 12 in this manner.

Figure 13:
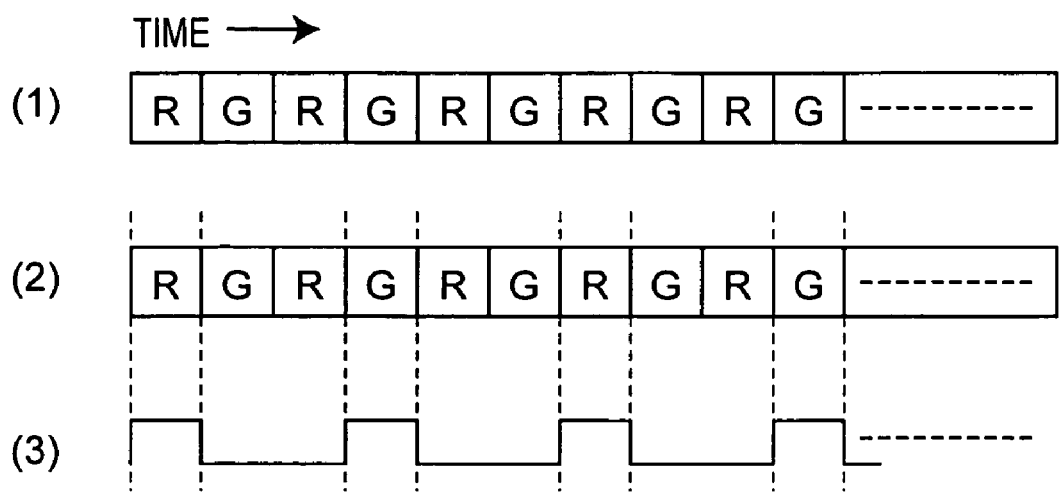
FIG. 13 is a timing chart for explaining the raw data and the SDRAM write control signal, where (1) shows the raw data input to the pre-processing circuit, (2) shows the raw data input to the memory controller, (3) shows the SDRAM write control signal input to the memory controller.

The pre-processing circuit 102 will now be explained. The pre-processing circuit 102 directly outputs the raw data input thereto to the memory controller 16. On the other hand, the thinning out circuit 103 in the pre-processing circuit 102 outputs the SDRAM write control signal (shown as "a1" in FIG. 10) to the memory controller 16. That is, the pre-processing circuit 102 outputs the raw data and the SDRAM write control signal simultaneously to the memory controller 16. FIG. 13 is a timing chart for explaining the raw data and the SDRAM write control signal. In FIG. 13, (1) shows the raw data input to the pre-processing circuit 102, (2) shows the raw data input to the memory controller 16, and (3) shows the SDRAM write control signal input to the memory controller 16. As shown in FIG. 13, the SDRAM write control signal becomes high-level at a constant cycle. More specifically, the SDRAM write control signal becomes high-level when certain pixel data is input to the memory controller 16 and becomes low-level when the two pixel data are continuously input to the memory controller 16 thereafter. After such two pixel data are input to the memory controller 16, the SDRAM write control signal again becomes high-level when the third pixel data is input. The SDRAM write control signal indicates permission to write data in the SDRAM 17 with high-level (HI) and indicates inhibition to write data in the SDRAM 17 with low-level (LO). Thus, only the pixel data input to the memory controller 16 at the timing same as the timing the SDRAM write control signal becomes high-level is output from the memory controller 16 to the SDRAM 17.

When a plurality of pixel data corresponding to one horizontal line in the imaging element 12 is input to the memory controller 16, the SDRAM write control signal becomes high-level at a rate of one out of three pixel data input to memory controller 16, as shown in FIG. 13. Therefore, for one horizontal line of the imaging element 12, the raw data in which the pixel data is thinned out to ⅓ is stored in the SDRAM 17.

The memory controller 16 then reads and transfers the raw data in which the number of pixel data (that is, number of data) is reduced by the thinning out circuit 13 to the camera signal processing circuit 18. The camera signal processing circuit 18 performs camera signal process on the raw data and generates YC data (YC) expressed by the luminance signals (Y) and the chrominance signals (C). The memory controller 16 reads and stores the YC data to the SDRAM 17. The camera signal processing circuit 18 performs processes such as white balance process, γ conversion process, luminance signal generating process, chrominance signal generating process, and aperture correcting process for improving resolution on the raw data. Further, the zoom process (to be hereinafter described) is performed on the raw data by the zoom processing circuit 104. Due to such zoom process, the pixel data corresponding to one horizontal line of the imaging element 12 is further reduced.

Next, when displaying the captured image on the liquid crystal display unit 21, the memory controller 16 reads the YC data for displaying stored in the SDRAM 17 and transfers such YC data to the display circuit 20. The display circuit 20 converts the YC data to signals (display data) for displaying and outputs the signals to the liquid crystal displaying unit 21. The liquid crystal displaying unit 21 displays the image represented by the signals for displaying.

Further, when compressing and storing the YC data in the SDRAM 17, the memory controller 16 reads the YC data stored in the SDRAM 17 and outputs the YC data to the JPEG compression circuit 19. The JPEG compression circuit 19 performs compression process on the YC data by the JPEG standard and generates coded data (JPC). The memory controller 16 reads the coded data from the JPEG compression circuit 19 and stores the coded data in the SDRAM 17.

The card controller 22 is connected to the SDRAM 17, and reads the JPEG coded data stored in the SDRAM 17 and write it in the recording medium 23.

The power consumed at the interface of the memory controller 16 and the SDRAM 17 will now be estimated. A case of displaying the captured image on the liquid crystal display unit 21 will now be considered by way of an example. The amount of information of the raw data output from the pre-processing circuit 102 is 10 bits by way of an example. The number of pixels of the imaging element 12 is assumed to be five million pixels, and the number of pixels of one horizontal line is 2560 pixels. Further, the number of pixels (number of pixel data) per one horizontal line when the zoom process (interpolation and thinning out process) is performed by the camera signal processing circuit 18 to generate the YC data (luminance signals of 8 bits, chrominance signals of 8 bits) for displaying is 720 pixels.

When displaying the captured image on the liquid crystal display unit 21, the flow of data transferred between the memory controller 16 and the SDRAM 17 is as explained with the first embodiment.

When storing the raw data which is thinned out to ⅓ per one horizontal line in the SDRAM 17, the amount of data of the data transferred between the memory controller 16 and the SDRAM 17 is expressed with Eq. (6) per one horizontal line. Here, if the raw data is thinned out to ⅓ per one horizontal line, the number of pixels of one horizontal line becomes 853 pixels.

$$853 \text{ pixels} \times 10 \text{ bits} \times 2 + 720 \text{ pixels} \times (8+8) \text{ bits} \times 2 = 40100 \text{ bits} \quad (6)$$

On the other hand, when storing the raw data output by the A/D conversion circuit 16 to the SDRAM 17 without thinning it out, the amount of data of the data transferred between the memory controller 16 and the SDRAM 17 is expressed by Eq. (7) per one horizontal line.

$$2560 \text{ pixels} \times 10 \text{ bits} \times 2 + 720 \text{ pixels} \times (8+8) \text{ bits} \times 2 = 74240 \text{ bits} \quad (7)$$

Referring to Eq. (6) and Eq. (7), the entire amount of data of the data transferred between the memory controller 16 and the SDRAM 17 differ between when thinning-out is performed and when not performed. More specifically, since 40100/74240=0.54 is concluded, the entire amount of data transferred between the memory controller 16 and the SDRAM 17 when thinning-out is performed is 54% of when thinning-out is not performed. Here, the amount of data of the data transferred between the memory controller 16 and the SDRAM 17 is proportional to the power consumption at the interface between them, and thus the power consumption of the imaging system according to the present embodiment becomes 54% of that of the conventional imaging system in which thinning-out is not performed. That is, according to the imaging system of the present embodiment, by performing thinning-out with the thinning out circuit 15, about 46% of the power can be reduced when displaying the captured image on the liquid crystal display unit 21.

Similarly, when compressing and storing the YC data in the SDRAM 17, the power consumption can be reduced compared to the conventional imaging system.

According to the imaging system of the present embodiment, when performing signal process at the camera signal processing circuit 18, the amount of data of the raw data read out from the SDRAM 17 is reduced compared to the conventional imaging system. Therefore, the processing speed when reading the raw data from the SDRAM 17 is faster.

Figure 14:
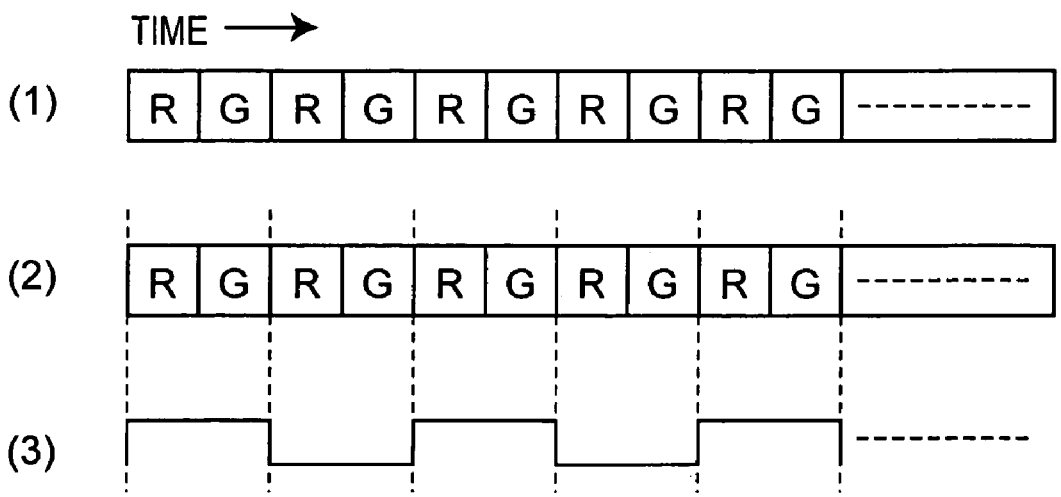
FIG. 14 is a timing chart for explaining the raw data and the SDRAM write control signal when reducing the number of data of the raw data to be written to the SDRAM 17 to ½, where (1) shows the raw data input to the pre-processing circuit, (2) shows the raw data input to the memory controller, (3) shows the SDRAM write control signal input to the memory controller.

In the imaging system of the present embodiment, by performing thinning-out with the thinning out circuit 15, the number of data of the raw data to be written in the SDRAM 17 is reduced to ⅓, but the rate of reduction is not limited thereto. For instance, it may be reduced to ½. FIG. 14 is a timing chart for explaining the raw data and the SDRAM write control signal when reducing the number of data of the raw data to be written in the SDRAM 17 to ½. In FIG. 14, (1) shows the raw data input to the pre-processing circuit 102, (2) shows the raw data input to the memory controller 16, and (3) shows the SDRAM write control signal input to the memory controller 16. Referring to FIG. 14, the SDRAM write control signal changes level each time two pixel data (R data and G data) are input to the memory controller 16. That is, if it is at high-level when certain R data and certain G data are continuously input, it is changed to low-level when R data and G data are then input. Even in such case, same effects is obtained as the imaging system according to the present embodiment has are obtained.

By controlling the photodiodes in the imaging element 12 with the drive circuit 13, the thinning-out of the output signals of the imaging element 12 in the vertical direction, that is, thinning-out of the number of horizontal lines is also possible. In this case, when the monitor mode is set, the signals decimated in the vertical direction by the drive circuit 13 are output from the solid-state imaging element 12, and such signals are input to the A/D conversion circuit 15 via the analog signal 14.

SEVENTH EMBODIMENT

Figure 15:
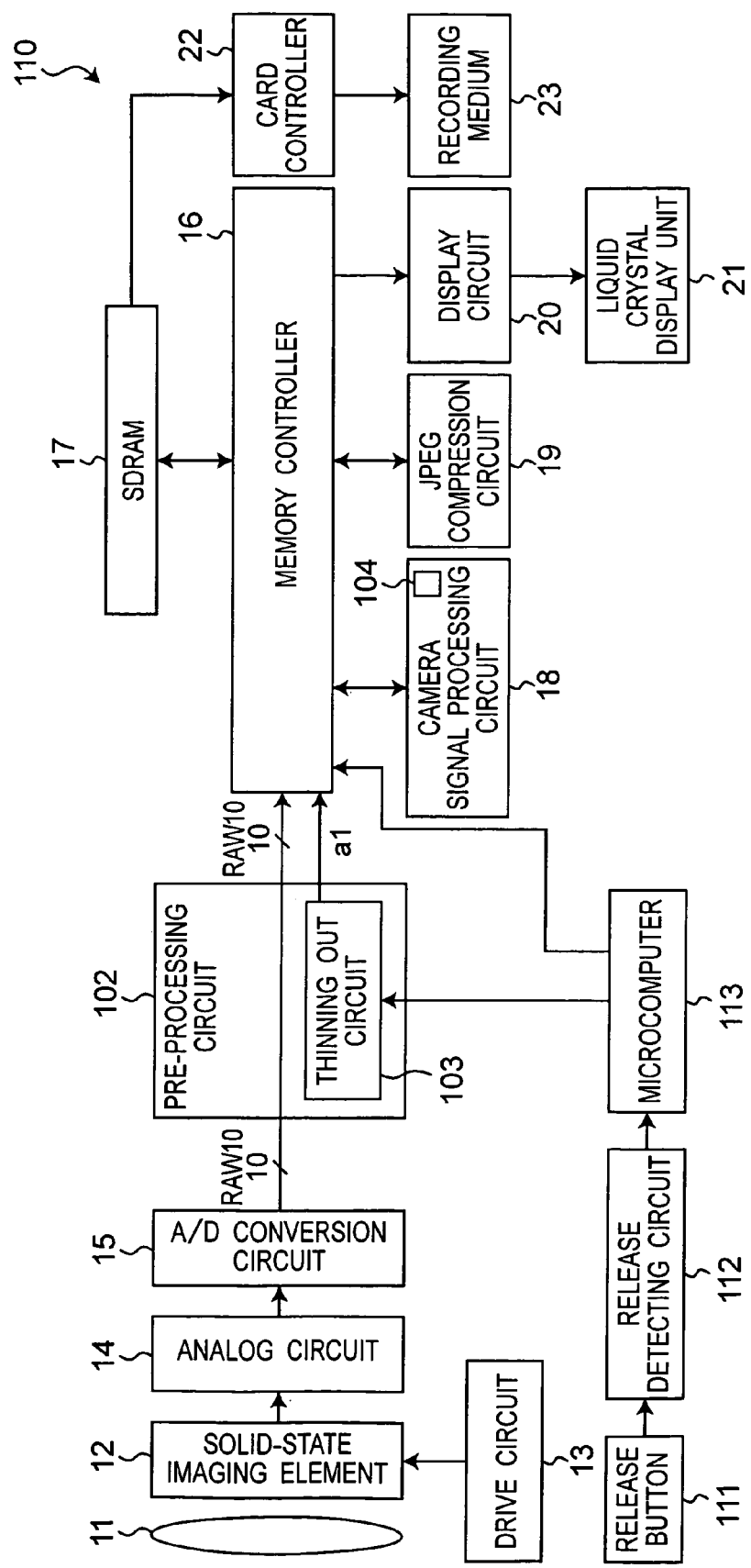
FIG. 15 is a block diagram of a configuration of an imaging system according to a seventh embodiment.

FIG. 15 is a block diagram of a configuration of an imaging system according to a seventh embodiment of the present invention. In FIG. 15, components same as the imaging system of FIG. 10 are given the same reference characters and thus the explanation thereof is omitted. The imaging system 110 according to the present embodiment differs from the imaging system according to the sixth embodiment in that it includes a release button, a release detection circuit for detecting the state (whether the release button is pushed or not) of the release button, and a microcomputer are further included. The microcomputer controls the thinning out circuit in accordance with the state of the release button.

As shown in FIG. 15, the imaging system 110 includes a release button 111, a release detection circuit 112 and a microcomputer 113. The release detection circuit 112 is connected to the release button 111, and outputs a signal indicating whether the release button 111 is pushed by the user or not to the microcomputer 113. The microcomputer 113 is connected to the thinning out circuit 103 and the memory controller 16, and controls the thinning out circuit 103 and the memory controller 16 in response to the signal from the release detection circuit 112.

In the imaging system 30, the operations from when light enters the optical lens 11 until the A/D conversion circuit 15 outputs the digital signals are as explained in the first embodiment irrespective of the status of the release button 111. However, the operations after the A/D conversion circuit 15 outputs the digital signals to the pre-processing circuit 102 differ between when the release button 111 is pushed and when not pushed. When the release button 111 is not pushed and is on the upper position, normally, the digital still camera does not capture the still image, and the image of the angle field for capturing is displayed on the liquid crystal display unit (hereinafter referred to as "monitor mode") to check it before capturing. In the monitor mode, the pre-processing circuit 102 carries out the thinning out process as explained in the sixth embodiment, and the raw data in which the amount of data has been reduced is stored in the memory 17.

The operations from when the raw data is read out and output to the camera signal processing circuit 18, to when the YC data generated at the camera signal processing circuit 18 is output to the display circuit 20 are as explained in the first embodiment.

When the release button 111 is not pushed, the release detection circuit 12 may output a signal indicating that the release button 111 is not pushed from the release detection circuit 112 or may not output any signal.

A case in which the release button 111 is pushed to take the still image (hereinafter referred to as "still image mode") will now be explained. When the release button 111 is pushed, a signal indicating that the release button 111 has been pushed is output to the microcomputer 113. Here, the microcomputer 113 makes the thinning out circuit 103 stop thinning-out. More specifically, it drives the thinning out circuit 103 to constantly output the SDRAM write control signal of high-level. The raw data output from the pre-processing circuit 102 to the memory controller 16 are all stored in the SDRAM 17 by the memory controller 16.

The operations of the imaging system after the raw data is stored in the SDRAM 16 are the same for both in monitor mode and in still image mode. These operations are as follows. The memory controller 16 reads the raw data stored in the SDRAM 17 and transfers the raw data to the camera signal processing circuit 18. The camera signal processing circuit 18 performs the camera signal process on the raw data and generates the YC data (YC) expressed by the luminance signals (Y) and the chrominance signals (C). The memory controller 16 reads and stores the YC data in the SDRAM 17. The camera signal processing circuit 18 performs processes such as white balance process, γ conversion process, luminance signal generating process, chrominance signal generating process, and aperture correcting process for improving resolution on the raw data.

In case of the still image mode, the memory controller 16 next reads the YC data for recording stored in the SDRAM 17 and outputs it to the JPEG compression circuit 19. The JPEG compression circuit 19 performs compression process by the JPEG standard, and generates the coded data (JPC). The memory controller 16 reads the coded data from the JPEG compression circuit 19 and stores such data in the SDRAM 17.

The coded data stored in the SDRAM 17 is read by the card controller 122 and written to the recording medium 23.

According to the imaging system of the present embodiment, the operation of the thinning out circuit can be changed between in the monitor mode in which the image of high resolution does not need to be displayed, and in the still image mode in which the image of high resolution must be recorded. Thus, in the monitor mode, the raw data can be decimated to reduce the power consumption at the interface of the SDRAM and the memory controller, and in the still image mode, the image with good quality of high resolution can be stored in the SDRAM.

Figure 16:
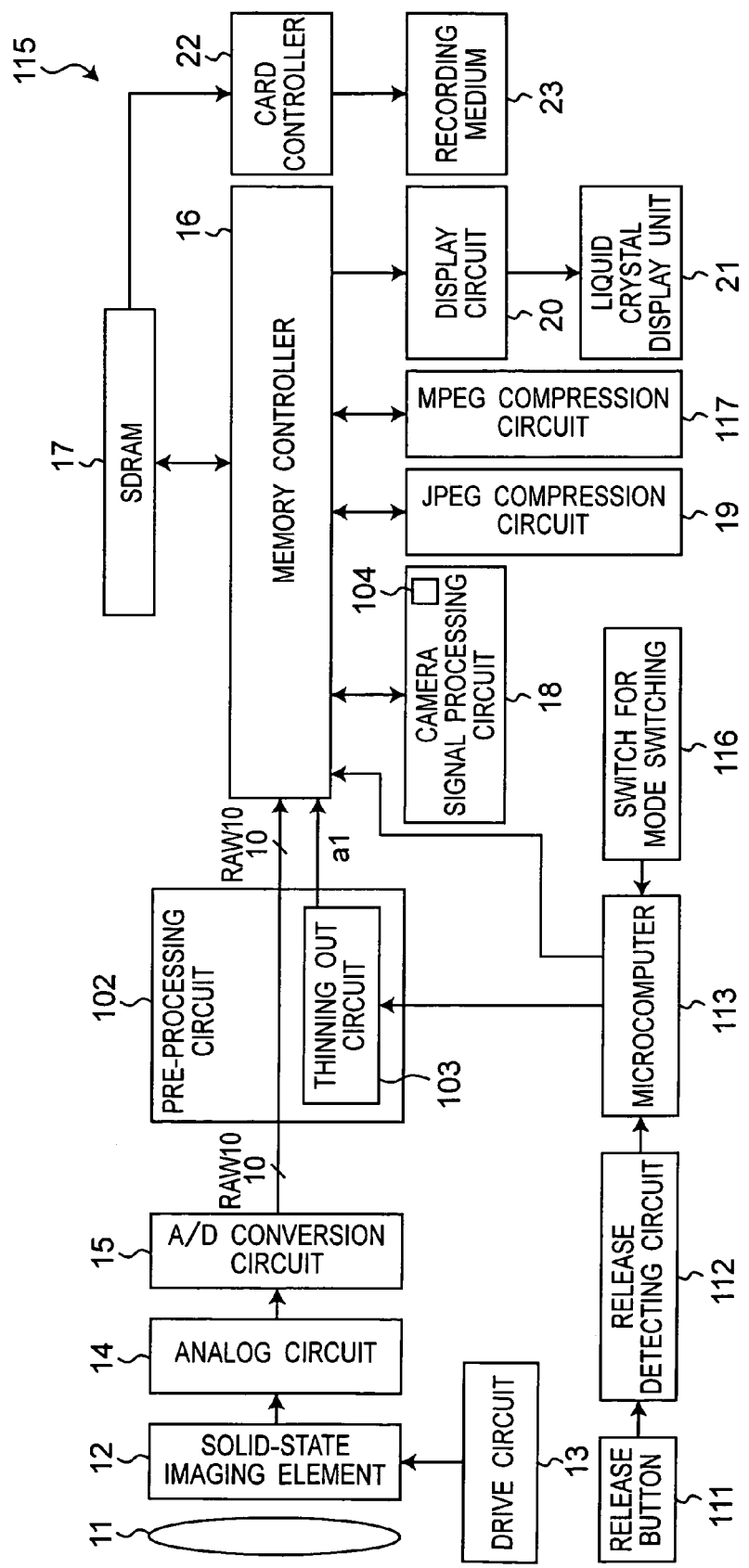
FIG. 16 is a block diagram of a configuration of an imaging system, as a variant of the imaging system of FIG. 15, for switching between a still image mode and a moving image mode.

In the imaging system according to the present embodiment, the modes are switched between the monitor mode and the still image mode, but further, modes may be switched between the monitor mode, the still image mode, and the moving image mode. FIG. 16 is a block diagram of a configuration of the imaging system in which switches the modes among the above modes. In FIG. 16, components same as the imaging system of FIG. 15 are given the same reference characters. The imaging system 115 of FIG. 16 differ from the imaging system 110 of FIG. 15 in that a mode switching switch 116 and an MPEG (Moving image Experts Group) compression circuit 117 are further included. When the user pushes the release button 111, the still image may be taken or the moving image may be taken. The user may input the mode to the imaging system using the mode switching switch 116. The mode switching switch 116 outputs a signal to the microcomputer 113. The signal indicates which mode the user has selected. When the signal is output from the release detection circuit 112 to the microcomputer 113 which indicates that the release button 111 has been pushed, the microcomputer 113 makes the thinning out circuit 103 start the thinning out process irrespective of which mode the user has selected. However, when the signal is input to the microcomputer 13, which indicates that the user has selected the still image mode with the mode switching switch 116, the microcomputer 13 makes the memory controller 16 read the YC data for recording from the SDRAM 17 and transfer it to the JPEG compression circuit 19. When the signal is input to the microcomputer 13, which indicates that the user has selected the moving image mode with the mode switching switch 116, the microcomputer 13 makes the memory controller 16 read the YC data for recording from the SDRAM 17 and transfer it to the MPEG compression circuit 117.

Here, by controlling the drive circuit 13 with the microcomputer 113, the photodiode in the imaging element 12 is controlled by the drive circuit 13. Thus, at the same time as decimating the data of each horizontal line, thinning-out of the output signals of the imaging element 12 in the vertical direction, that is, thinning-out of the number of horizontal lines is also possible.

EIGHTH EMBODIMENT

An imaging system according to the present embodiment includes a zoom processing circuit having an interpolation circuit and a thinning out circuit as the pre-processing circuit arranged between the A/D conversion circuit and the memory controller.

Figure 17:
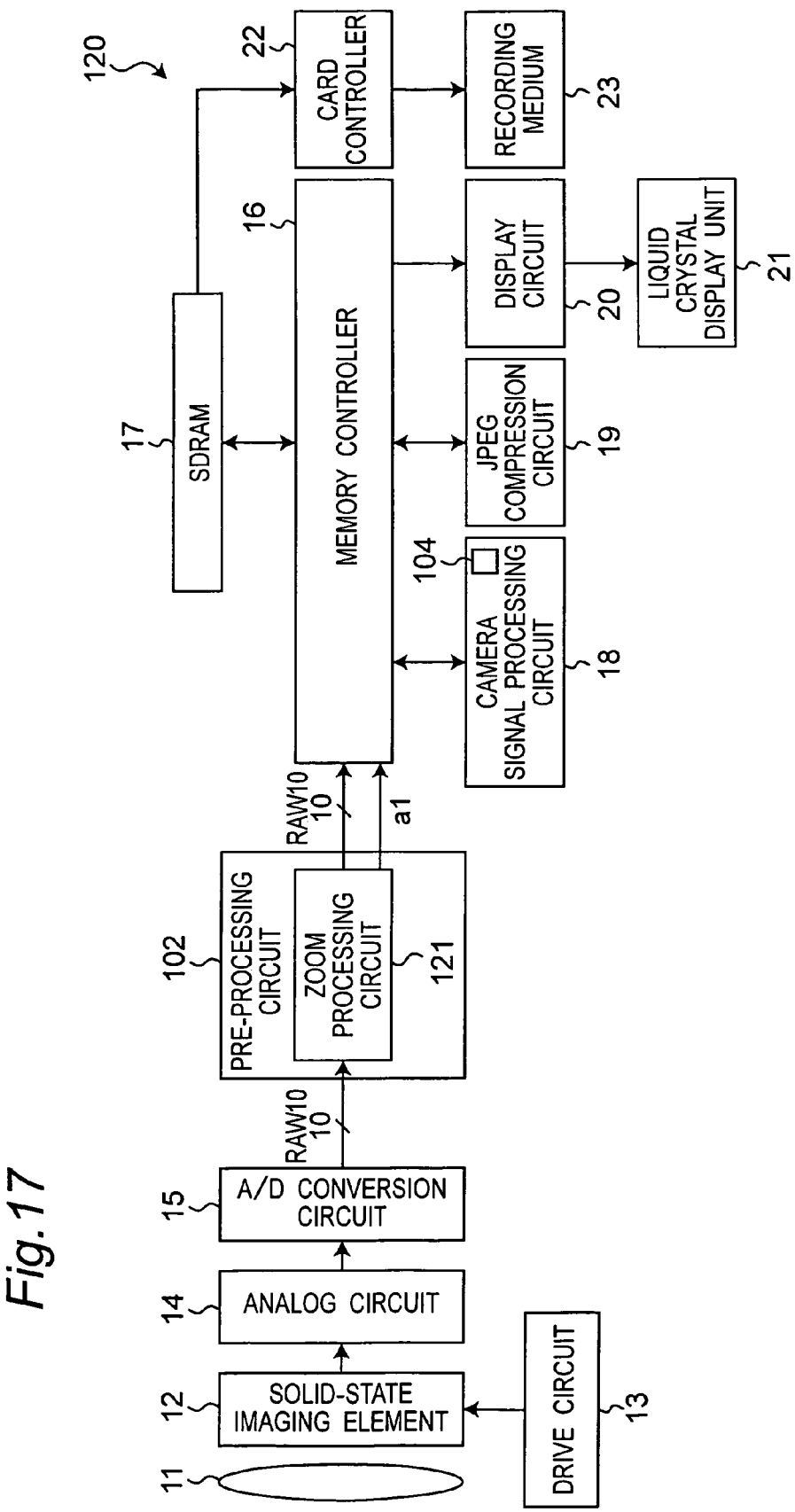
FIG. 17 is a block diagram of a configuration of an imaging system according to an eighth embodiment.

FIG. 17 is a block diagram of a configuration of the imaging system according to an eighth embodiment of the present invention. In FIG. 17, components same as the imaging system of FIG. 17 are given the same reference characters and thus the explanation thereof is omitted. The imaging system 120 according to the present embodiment differ from the imaging system 115 according to the sixth embodiment in that the pre-processing circuit 102 includes a zoom processing circuit 121 having the thinning out circuit and an interpolation circuit.

Figure 18:
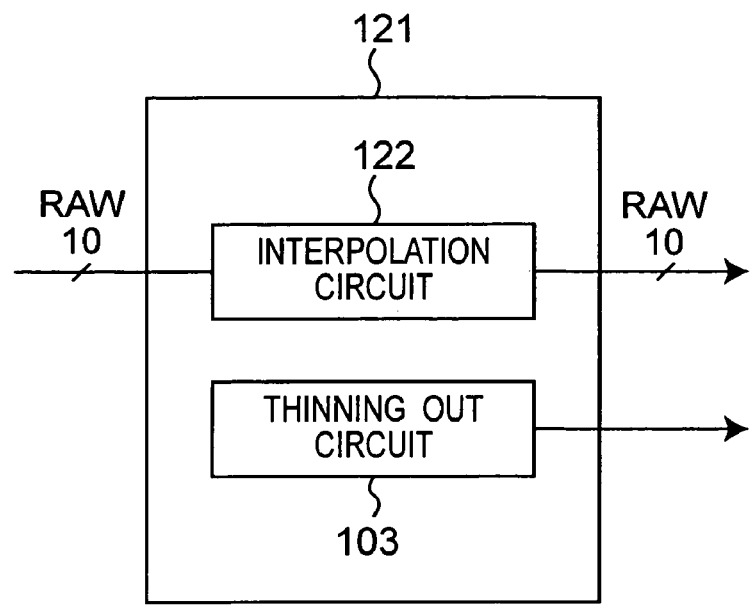
FIG. 18 is a block diagram of a configuration of a zoom processing circuit in the imaging system of FIG. 17.

FIG. 18 is a block diagram showing the configuration of the zoom processing circuit 121. As shown in FIG. 18, the zoom processing circuit 121 includes the thinning out circuit 103 and the interpolation circuit 122. The raw data output from the A/D conversion circuit 15 is input to the interpolation circuit 122. The data output from the interpolation circuit 122 is input to the memory controller 16.

Figure 19:
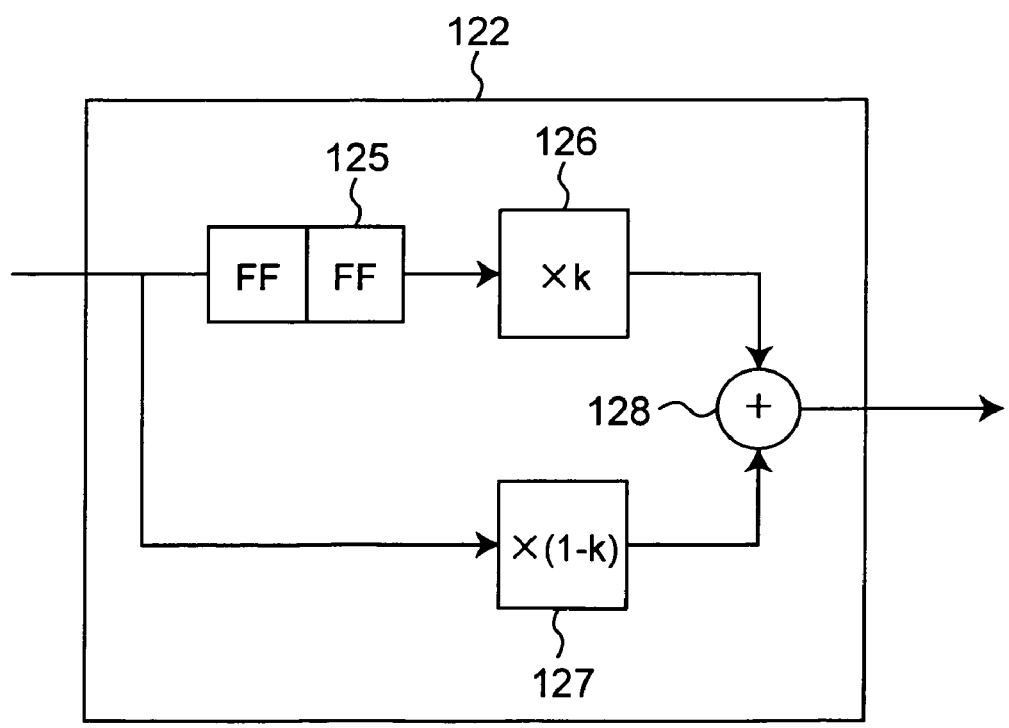
FIG. 19 is a diagram of a configuration of an interpolation circuit in the zoom processing circuit of FIG. 18.

The interpolation circuit 122 will now be explained. FIG. 19 is a view showing the configuration of the interpolation circuit 122. As shown in FIG. 19, the interpolation circuit 122 includes a delay flip-flop (hereinafter referred to as "D flip-flop") 125, a first multiplier circuit 126, a second multiplier circuit 127, and an adder circuit 128. A plurality of signals input to the interpolation circuit 122 is branched into two (not "separated", the signals input to the interpolation circuit 122 flows in two directions), where one is input to the D flip-flop 125, and the other is input to the second multiplier circuit 127. The D flip-flop 125 delays the input signals by two clocks (one clock is one period of operation frequency of the imaging system), and outputs them to the first multiplier circuit 126. The first multiplier circuit 126 multiplies each of the input signals by k (k is a zoom coefficient) and outputs the signals multiplied by k, whereas the second multiplier circuit 127 multiplies each of the input signals by (1−k) and outputs the signals multiplied by (1−k). The signals output from the first multiplier circuit 126 and the second multiplier circuit 127 are each input to the adder circuit 128. The adder circuit 128 adds each of the output signals of the first multiplier circuit 126 and each of them of the second multiplier circuit 127, and outputs the resultant signal to the memory controller 16. The adder circuit 128 adds the resultant in which the pixel data of a certain central pixel is multiplied by (1−k), and the resultant in which the pixel data output two clocks earlier than the pixel data of the certain central pixel is multiplied by k.

Figure 20:
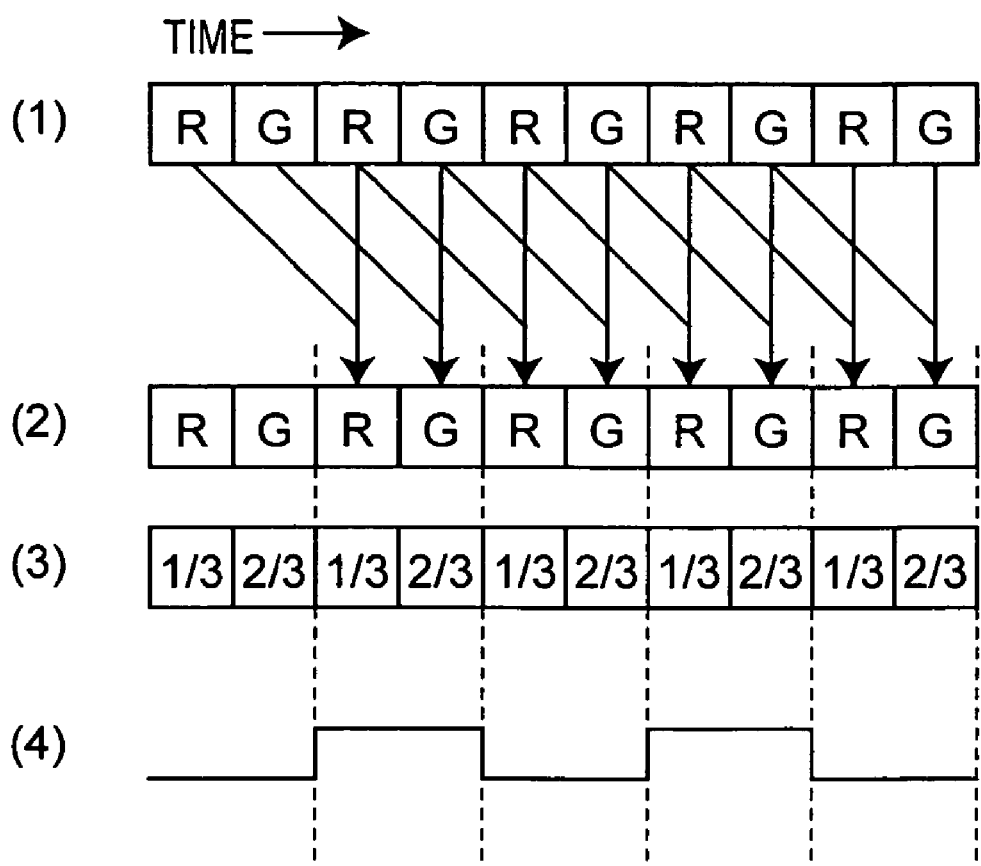
FIG. 20 is a timing chart for explaining the raw data and the SDRAM write control signal input to the memory controller when the interpolation circuit of FIG. 19 outputs the raw data to the memory controller, where (1) shows the raw data input to the preprocessing circuit, (2) shows the raw data input to the memory controller, (3) shows the zoom coefficient, and (4) shows the SDRAM write control signal input to the memory controller.

A case of carrying out the zoom process of ½ times to the raw data output from the A/D conversion circuit 15 when the color filters of the imaging element 12 are arranged as in FIG. 11 will now be explained. FIG. 20 shows a timing chart for explaining the raw data and the SDRAM write control signal input to the memory controller 16 when the interpolation circuit 122 outputs the raw data to the memory controller 16. In FIG. 20, (1) shows the raw data input to the pre-processing circuit 102, (2) shows the raw data input to the memory controller 16, (3) shows the zoom coefficient k (0<k<1), and (4) shows the SDRAM write control signal input to the memory controller 16.

Referring to FIG. 20, the R data is first input to the interpolation circuit 122. The R data input to the interpolation circuit 122 is branched into two, where one is input to the D flip-flop 125 and the other is input to the second multiplier circuit 127. As shown in FIG. 20 (3), the zoom coefficient in this case is ⅓, and therefore the R data input to the second multiplier circuit 127 is multiplied by ⅔(=1−⅓). The R data multiplied by ⅔ is output from the second multiplier circuit 127 to the adder circuit 128. On the other hand, the R data output from the first multiplier circuit 126 is output from the adder circuit 128 lately by two clocks than that is output from the second multiplier circuit 127. Thus, only the R data multiplied by ⅔ is output to the adder circuit 128, and the interpolation circuit 122 outputs such R data multiplied by ⅔ to the memory controller 16. This is the same for the G data input to the interpolation circuit 122 next. Here, when the G data is input to the interpolation circuit 122, the zoom coefficient is ⅔.

The second R data is then input to the interpolation circuit 122. This R data is also branched into two as mentioned above, where one is input to the D flip-flop, and the other is input to the second multiplier circuit 127. As shown in FIG. 20 (3), the zoom coefficient in this case is ⅓, and the R data input to the second multiplier circuit 127 is multiplied by ⅔. The R data multiplied by ⅔ (hereinafter referred to as "first R data") is then output to the adder circuit 128. The R data (hereinafter referred to as "second R data") obtained by multiplying the R data which is input to the interpolation circuit 122 two clocks before by ⅓ is output from the first multiplier circuit 126 to the adder circuit 128. The adder circuit 128 adds the first R data and the second R data, and outputs the resultant R data to the memory controller 16.

Similar process is performed on the R data and the G data subsequently input to the interpolation circuit 122. The zoom coefficients when the R data and the G data are input to the interpolation circuit 122 are ⅓ and ⅔, respectively. The arrow shown in FIG. 20 shows that certain pixel data input to the interpolation circuit 122 and the pixel data input thereto two clocks earlier than the certain pixel data is input thereto are interpolation processed and input to the memory controller 16.

FIG. 20 (4) shows the SDRAM write control signal output to the memory controller 16 at the same time as the raw data shown in FIG. 20 (2). As shown in FIG. 20 (4), the SDRAM write control signal becomes high-level at a constant cycle. More specifically, the SDRAM write control signal is at the low-level when each of the R data and the G data are first input to the memory controller 16, and thereafter changed to high-level when two pixel data (second R data and second G data) are continuously input to the memory controller 16. After the two pixel data are input to the memory controller 16, the SDRAM write control signal again becomes low-level when two pixel data (third R data and third G data) are continuously input. The signal level of the SDRAM write control signal changes every time two pixel data are input to the memory controller 16 in this manner. Only the pixel data input to the memory controller 16 at the timing same as the timing when the SDRAM write control signal becomes high-level is output from the memory controller 16 to the SDRAM 17.

Figure 21:
FIG. 21 is a view showing a relative positional relationship of R data and G data in the raw data after the zoom process shown in FIG. 20.

FIG. 21 shows a relative positional relationship of the R data and the G data in the raw data after the above zoom process (interpolation process and thinning out process). As shown in FIG. 21, in the raw data, the R data and the G data are equally spaced. The positional relationship of the R data and the G data equally spaced can be achieved by properly selecting the zoom coefficient in the interpolation process and a ratio of thinning out in the thinning out process.

In this imaging system, when the zoom process of ½ times is carried out to the raw data output from the A/D conversion circuit 15 with the pre-processing circuit 102, the amount of data of the data transferred between the memory controller 16 and the SDRAM 17 when displaying the captured image on the liquid crystal display unit 21 is expressed by Eq. (8) per one horizontal line. When the zoom process of ½ times per one horizontal line is carried out on the raw data, the number of pixels of one horizontal line is 1280 pixels.

$$1280 \text{ pixels} \times 10 \text{ bits} \times 2 + 720 \text{ pixels} \times (8+8) \text{ bits} \times 2 = 48640 \text{ bits} \quad (8)$$

Referring to Eq. (7) and Eq. (8), the entire amount of data of the data transferred between the memory controller 16 and the SDRAM 17 differ between when the zoom process is carried out and when not carried out. More specifically, since 48640/74240=0.66 is concluded, the entire amount of data of the data transferred between the memory controller 16 and the SDRAM 17 when the zoom process is carried out is 66% of that when the zoom process is not carried out. Thus, according to the imaging system of the present invention, by carrying out the zoom process with the zoom processing circuit 121, about 34% of the power can be reduced when displaying the captured image on the liquid crystal display unit 21.

According to the imaging system of the present embodiment, the signals send from the A/D conversion circuit 15 to the SDRAM 17 through the pre-processing circuit 102 and the memory controller 16 are the signals obtained as a result of performing the interpolation process on all the pixel data output from the A/D conversion circuit 15. Thus, the quality of the image displayed using the processed signal, which are obtained by processing on such signals, becomes satisfactory.

Further, according to the imaging system of the present embodiment, when signals are processed by the camera signal processing circuit 18, the amount of data of the raw data read from the SDFAM 17 is reduced compared to that in the conventional imaging system. Therefore, the processing speed when reading the raw data from the SDRAM 17 becomes faster.

Figure 22:
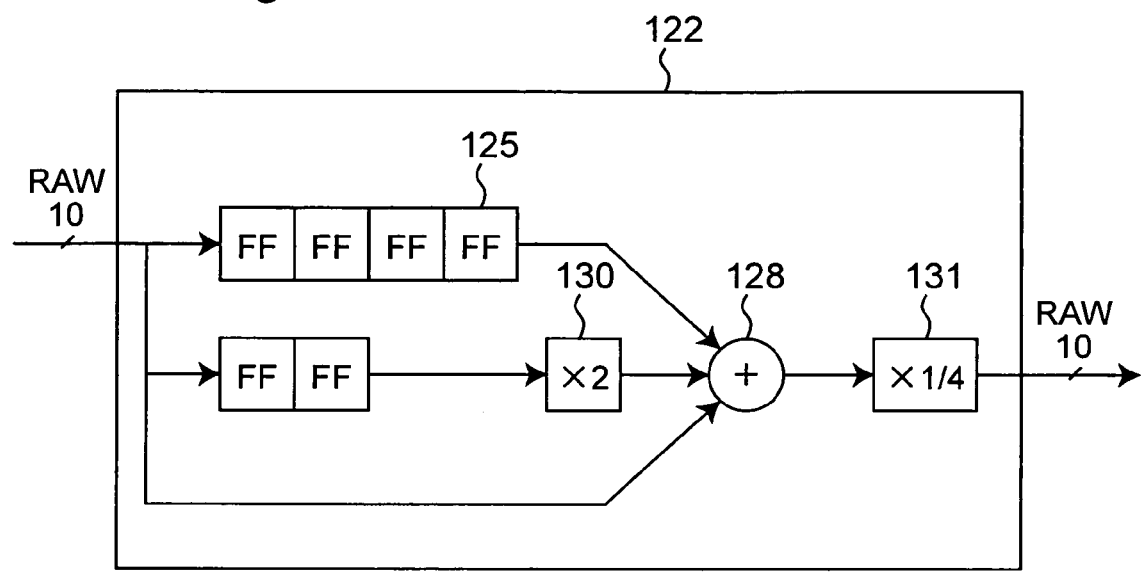
FIG. 22 is a block diagram of a configuration of another interpolation circuit in the zoom processing circuit of FIG. 18.

The interpolation process is not limited to the above. Thus, the interpolation circuit may be other circuits other than the above circuit. FIG. 22 is a block diagram showing a separate configuration of the interpolation circuit 122. In FIG. 22, components same as FIG. 19 are given the same reference characters and thus the explanation thereof is omitted. The interpolation circuit 122 includes multiplier circuits 130, 131 in place of the multiplier circuits 126, 127. As shown in FIG. 22, the interpolation circuit 122 carries out the process of adding and averaging that twice the fist signal corresponding to a certain pixel, that one times the second signal output two clocks earlier than the first signal, and that one times the third signal output two clocks later than the first signal. The raw data after the interpolation process is input to the memory controller 16.

Figure 23:
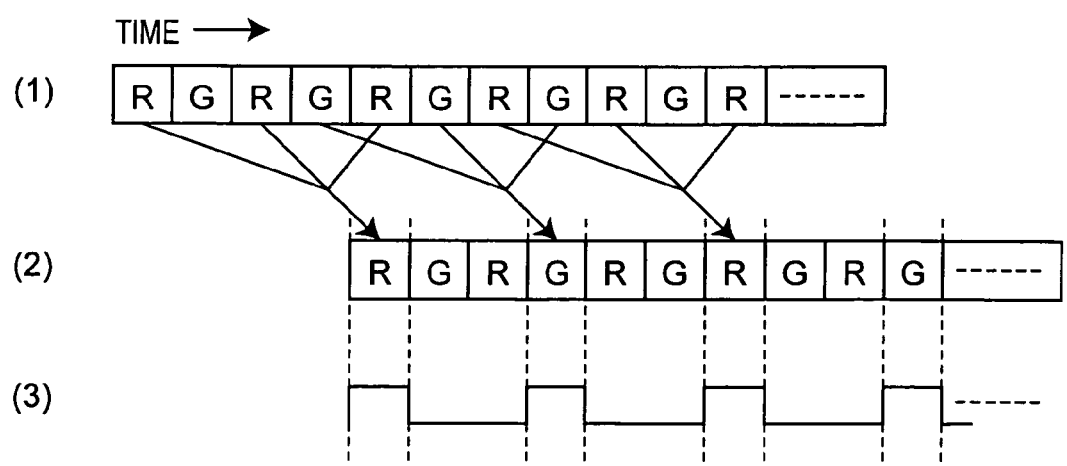
FIG. 23 is a timing chart for explaining the raw data and the SDRAM write control signal input to the memory controller when carrying out the zoom process of ⅓ times on the raw data output by the A/D conversion circuit when the color filters of the solid-state imaging element are arranged as in FIG. 18, where (1) shows the raw data input to the pre-processing circuit, (2) shows the raw data input to the memory controller, and (3) shows the SDRAM write control signal input to the memory controller.

In the above explanation, the magnification of the zoom process is ½ times but is not limited thereto. FIG. 23 is a timing chart for explaining the raw data and the SDRAM write control signal input to the memory controller 16 when carrying out the zoom process of ⅓ times to the raw data output by the A/D conversion circuit 15 when the color filters of the imaging element 12 are arranged as in FIG. 11. In FIG. 23, (1) shows the raw data input to the pre-processing circuit 102, (2) shows the raw data input to the memory controller 16, and (3) shows the SDRAM write control signal input to the memory controller 16. The arrow shown in FIG. 23 shows that the interpolation circuit of FIG. 22 performs the interpolation process using three pixel data. In the zoom process, the thinning out process after the interpolation process is performed is the same as the process explained using FIG. 13 and thus the explanation thereof is omitted.

Even when the zoom process (interpolation process and thinning out process) explained using FIG. 22 and FIG. 23 is carried out, the same effects as when the zoom process explained using FIG. 19 and FIG. 20 is carried out are obtained.

The configuration and operation of the zoom processing circuit 121 have been explained in detail, but the configuration and operation of the zoom processing circuit 104 are similar to those of the zoom processing circuit 121.

NINTH EMBODIMENT

Figure 24:
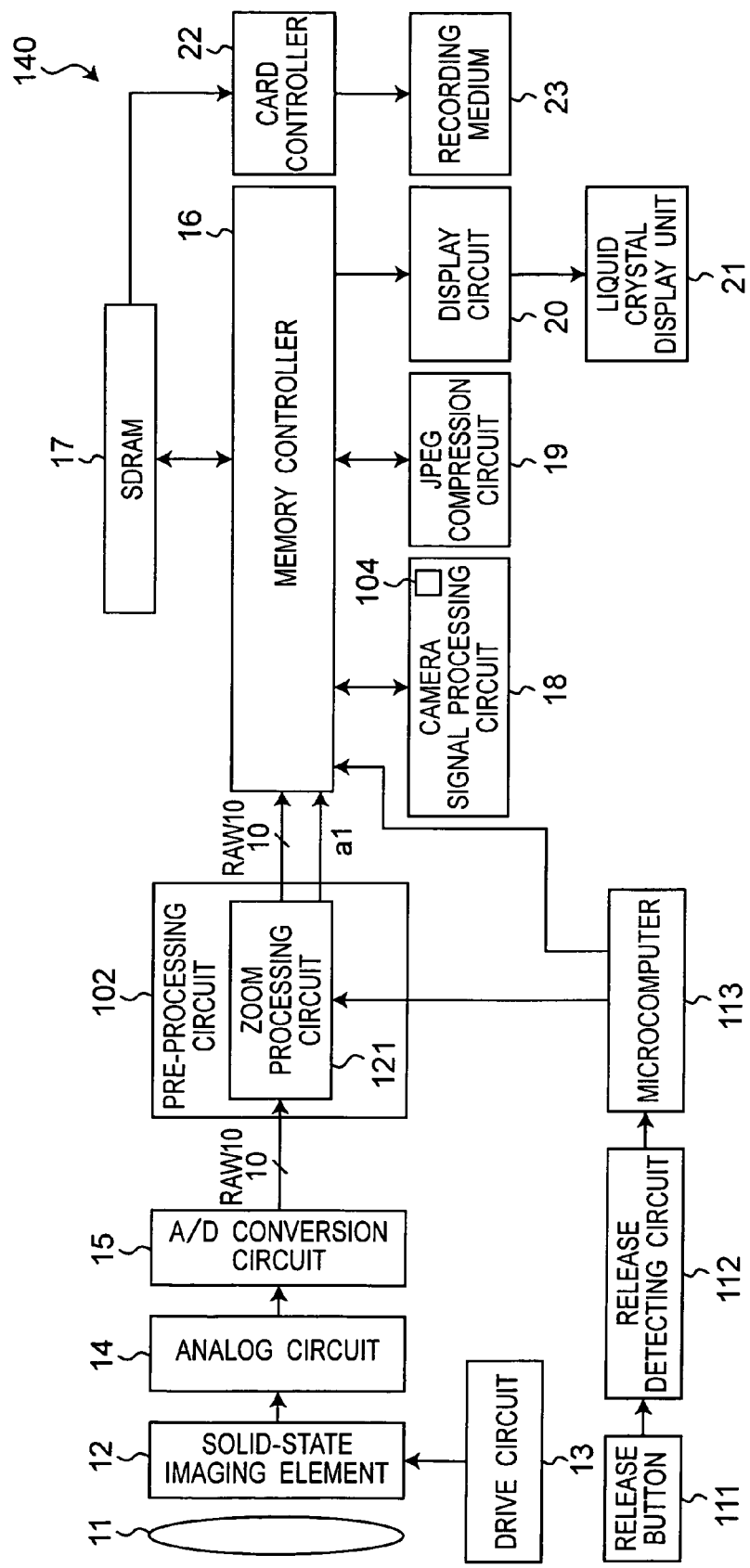
FIG. 24 is a block diagram of a configuration of an imaging system according to a ninth embodiment.

FIG. 24 is a block diagram of a configuration of an imaging system according to a ninth embodiment of the present invention. In FIG. 24, components same as the imaging system of FIG. 17 are given the same reference characters and thus the explanation thereof is omitted. The imaging system 140 according to the present embodiment differ from the imaging system 120 according to the eighth embodiment in that the release button 111, the release detection circuit 112 and the microcomputer 113 are further included. The release detection circuit 112 outputs a signal indicating whether the release button 111 is pushed or not. The microcomputer 113 controls the zoom processing circuit 121 in accordance with the status (signal output from the release detection circuit 112) of the release button 112.

Figure 25:
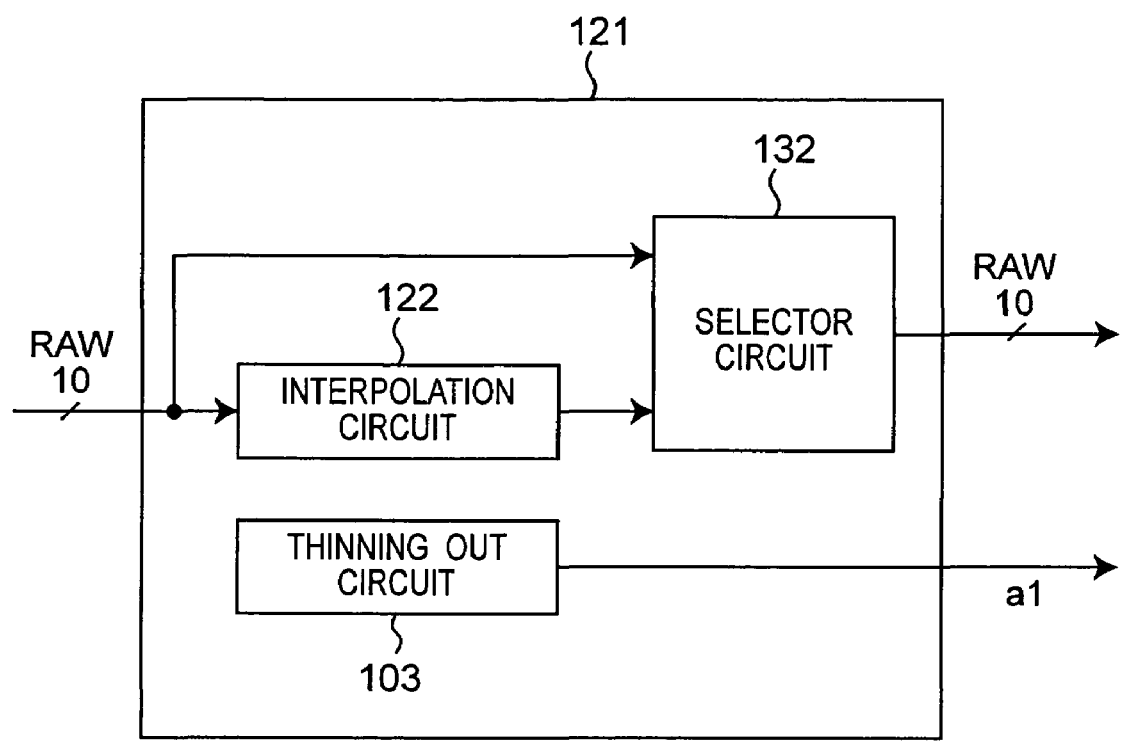
FIG. 25 is a block diagram of a configuration of a zoom processing circuit in the imaging system of FIG. 24.

FIG. 25 is a block diagram of a configuration of the zoom processing circuit 121. The components same as the zoom processing circuit 121 of FIG. 18 are given the same reference characters and the explanation thereof is omitted. The zoom processing circuit of FIG. 25 differs from the zoom processing circuit of FIG. 18 in that a selector circuit 132 is included. A plurality of signals input to the preprocessing circuit 121 is branched into two, and are input to the interpolation circuit 122 and the selector circuit 132. The selector circuit 132 selects either digital signals output from the A/D conversion circuit 15 or signals obtained by interpolating the digital signals output from the A/D conversion circuit 15 with the interpolation circuit 122, and outputs selected ones to the memory controller 16.

The microcomputer 111 controls the thinning out circuit 103 and the selector circuit 132 in accordance with the status of the release button 112. The control of the thinning out circuit 103 by the microcomputer 113 is as explained in the seventh embodiment. That is, the microcomputer 113 makes the thinning out circuit 103 perform thinning out process when a signal indicating that the release button 111 is pushed is not input from the release detection circuit 112 (or when a signal indicating that the release button 111 is not pushed is input from the release detection circuit 112), but makes the thinning out circuit 113 stop thinning-out when a signal indicating that the release button 111 has been pushed is input from the release detection circuit 112. Further, the microcomputer 113 makes the selector circuit 132 output signals interpolated by the interpolation circuit 122 when the signal, indicating that the release button 111 is being pushed, is not input from the release detection circuit 112. On the other hand, the microcomputer 113 makes the selector circuit 132 directly output the digital signals output from the A/D conversion circuit 15 when the signal, indicating that the release button 111 has been pushed, is input from the release detection circuit 122.

According to the imaging system of the present embodiment, the same effects as the imaging system according to the seventh embodiment has are obtained.

In the above imaging system, the selector circuit 132 directly outputs the digital signals output from the A/D conversion circuit 15 when the release button 111 is pushed, but even when the release button 111 is pushed, the signals interpolated by the interpolation circuit 122 may be output.

TENTH EMBODIMENT

Figure 26:
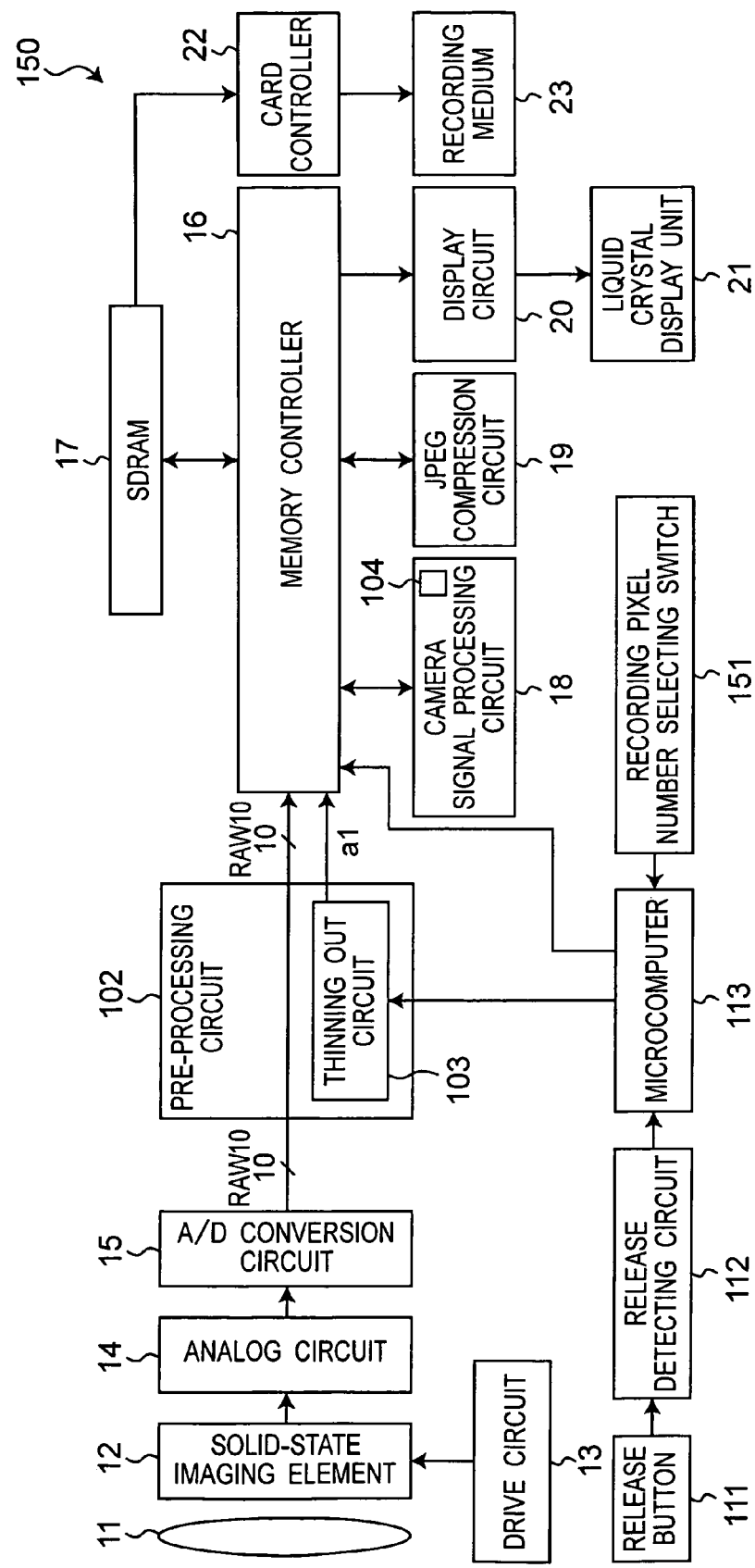
FIG. 26 is a block diagram of a configuration of an imaging system according to a tenth embodiment.

FIG. 26 is a block diagram of a configuration of an imaging system according to the present embodiment. In FIG. 26, components same as the imaging system of FIG. 15 are given the same reference characters and thus the explanation thereof is omitted. The imaging system according to the present embodiment differ from that according to the seventh embodiment in that a recording pixel number selecting switch is further included.

As shown in FIG. 26, the imaging system 150 according to the present embodiment includes a recording pixel number selecting switch 151. The user is able to set the number of pixels during recording using the recording pixel number selecting switch 151. Here, the thinning out circuit 103 of the pre-processing circuit 102 is operable at a plurality of thinning out modes which have different ratios of thinning out. When the signal indicating the number of recording pixels selected by the user is input to the microcomputer 113 from the recording pixel number selecting switch 151, the microcomputer 113 determines the ratio of thinning out from the number of recording pixels, and controls the thinning out circuit 103 so that the raw data is thinned out at such ratio of thinning out. A case where the user sets the number of pixels during recording as 1.3 million pixels when the number of pixels of the imaging element 12 is five million pixels will now be explained by way of example. When the number of pixels of the imaging element 12 is five million pixels, the horizontal lines having 2560 pixels per one line are lined in 1920 lines in the vertical direction. Further, the image of 1.3 million pixels has the horizontal lines having 1280 pixels per one line lined in 960 lines in the vertical direction. When recording the image captured by the imaging element 12 having the pixel number of five million pixels as the image of 1.3 million pixels, the number of pixels of one horizontal line must be changed from 2560 pixels to 1280 pixels. In this case, when a signal indicating that the selected number of recording pixel is 1.3 million pixels is input from the recording pixel number selecting switch 151, the microcomputer 113 controls the thinning out circuit 103 so that the raw data is thinned out at the ratio of 1/2. Thus, the thinning out circuit 105 outputs the SDRAM write control signal as shown in FIG. 14, for example, to the memory controller 16.

Figure 27:
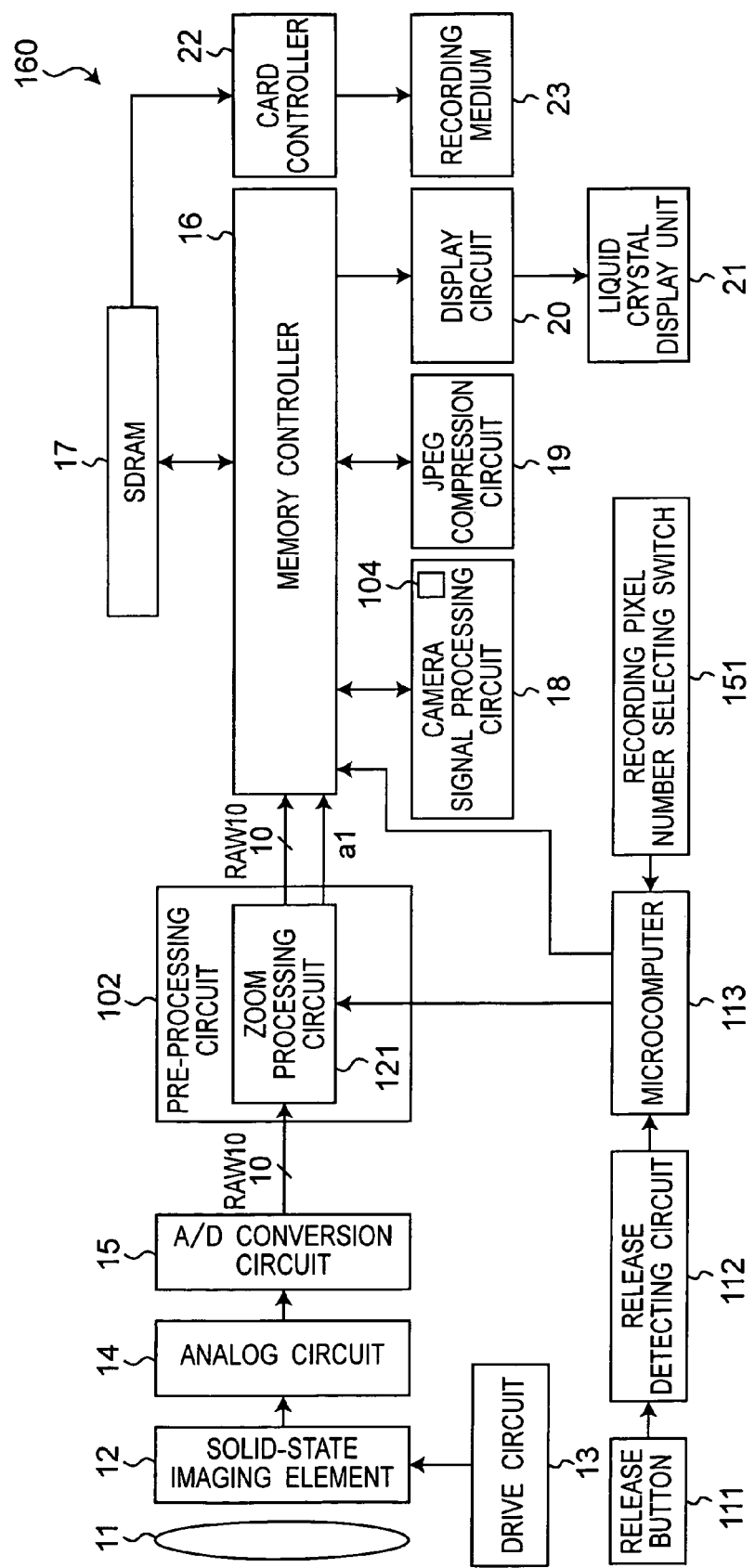
FIG. 27 is a block diagram of a configuration of another imaging system according to the tenth embodiment.
Figure 28:
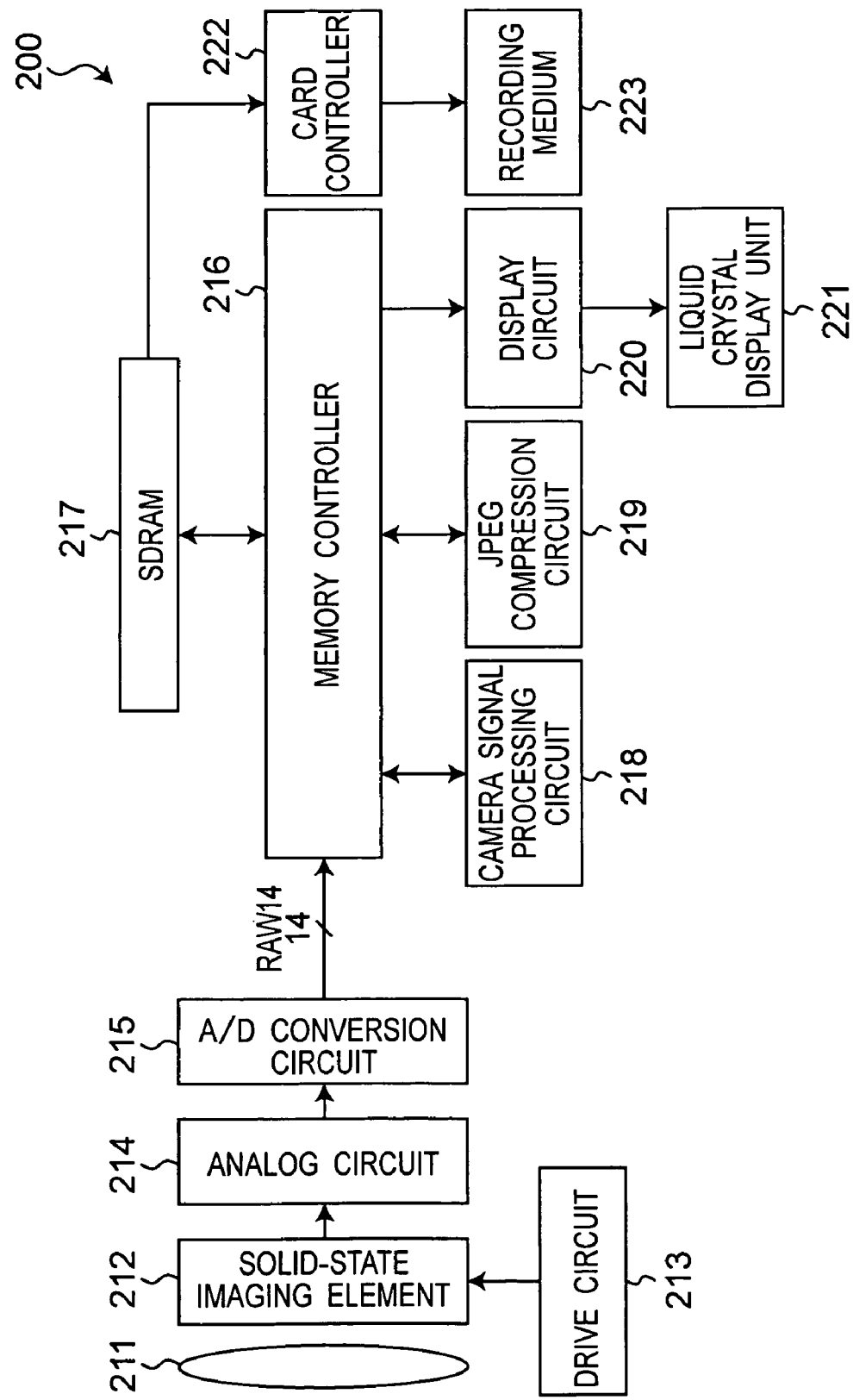
FIG. 28 is a block diagram of a configuration of a conventional imaging system.

According to the imaging system of the present embodiment, the thinning out circuit is controlled in accordance with the selected number of recording pixel, but the zoom processing circuit may be controlled. In this case, when the signal indicating the recording pixel number selected by the user is input from the recording pixel number selecting switch to the microcomputer, the microcomputer determines the zoom magnification from the recording pixel number, and controls the zoom processing circuit so that the raw data is zoom processed at such determined zoom magnification. FIG. 27 is a block diagram of a configuration of the imaging system for controlling the zoom processing circuit in accordance with the selected recording pixel number. The imaging system 160 shown in FIG. 27 has a configuration in which a recording pixel number selecting switch 151 is added to the imaging system 140 according to the ninth embodiment. According to the imaging system shown in FIG. 27, the same effects as the imaging system show in FIG. 26 has are obtained.

In the imaging system of the present invention, the pre-processing circuit arranged between the A/D conversion circuit and the memory controller may include both the information amount reducing circuit, and the thinning out circuit or the zoom processing circuit.

The present invention has been described with reference to a specific embodiment thereof, and other variations, modifications, and applications will be obvious to one with ordinary skill in the related art. The invention shall also not be limited to the description of the foregoing embodiment, and shall only be limited by the scope of the accompanying claims.

What is claimed is:

1. An imaging system comprising:
    an imaging device which outputs a plurality of digital signals each of which indicating an amount of light entered on a corresponding one of a plurality of pixels;
    a pre-processor which reduces an amount of data of the plurality of the digital signals output by said imaging device;
    a memory which stores digital signals; and
    a memory controller which writes the plurality of the digital signals output by said pre-processor in said memory, and reads the plurality of the digital signals from said memory;
    wherein said pre-processor comprises:
    a thinning out device which outputs a first control signal a level of which changes at a constant cycle to said memory controller; and
    an interpolation device which interpolates the plurality of the digital signals output by said imaging device;

said pre-processor outputs the first control signal and the plurality of the digital signals interpolated by said interpolation device to said memory controller together; and said memory controller writes in said memory only a digital signal among the plurality of the digital signals interpolated by said interpolation device which the digital signal is input to said memory controller when the first control signal is at a predetermined level.

2. The imaging system according to claim 1, further comprising:

a release button;

a second detector which outputs a status signal indicating whether said release button is pushed or not; and a thinning out controller which controls start and stop of an operation of said thinning out device in accordance with the status signal.

3. the imaging system according to claim 1, further comprising:

a processor which processes digital signals;

a mode switching device which outputs a mode signal indicating one of a first mode and a second mode; and a mode control device which controls an operation of said memory controller in accordance with the mode signal;

wherein said processor includes a first compression device and a second compression device; and said mode control device makes said memory controller output the digital signal to said first compression device which the digital signal is output by said memory when the mode signal indicates the first mode, while makes said memory controller output the digital signal to said second compression device which the digital signal is output by said memory when the mode signal indicates the second mode.

4. The imaging system according to claim 1, further comprising:

a selector which selects the number of recording pixels to output a second control signal indicating the number of recording pixels selected thereby; and a ratio controller which determines a ratio of thinning out the plurality of the digital signals in accordance with the second control signal output by said selector, and controls a change cycle of the level of the first control signal in accordance with the ratio.

* * * * *